US007840993B2

(12) United States Patent
Ganesan et al.

(10) Patent No.: US 7,840,993 B2
(45) Date of Patent: Nov. 23, 2010

(54) PROTECTING ONE-TIME-PASSWORDS AGAINST MAN-IN-THE-MIDDLE ATTACKS

(75) Inventors: Ravi Ganesan, Half Moon Bay, CA (US); Ravinderpal Singh Sandhu, Oak Hill, VA (US); Andrew Paul Cottrell, San Jose, CA (US); Brett Jason Schoppert, Leesburg, VA (US); Mihir Bellare, San Diego, CA (US)

(73) Assignee: TriCipher, Inc., Los Gatos, CA (US)

( * ) Notice: Subject to any disclaimer, the term of this patent is extended or adjusted under 35 U.S.C. 154(b) by 1165 days.

(21) Appl. No.: 11/415,065

(22) Filed: May 2, 2006

(65) Prior Publication Data

US 2007/0033642 A1     Feb. 8, 2007

Related U.S. Application Data

(60) Provisional application No. 60/677,408, filed on May 4, 2005.

(51) Int. Cl.
*H04L 29/06* (2006.01)

(52) U.S. Cl. .......................... 726/7; 713/168; 380/281; 380/259; 726/14

(58) Field of Classification Search ............... 726/7, 726/8, 10; 713/155, 169
See application file for complete search history.

(56) References Cited

U.S. PATENT DOCUMENTS

| 5,737,419 | A | * | 4/1998 | Ganesan | ............... 713/169 |
| 6,148,404 | A | | 11/2000 | Yatsukawa | |
| 6,161,139 | A | * | 12/2000 | Win et al. | ............... 709/225 |
| 6,370,649 | B1 | | 4/2002 | Angelo et al. | |
| 6,609,198 | B1 | * | 8/2003 | Wood et al. | ............... 713/155 |
| 6,908,030 | B2 | | 6/2005 | Rajasekaran et al. | |
| 2002/0002678 | A1 | | 1/2002 | Chow et al. | |
| 2002/0078344 | A1 | * | 6/2002 | Sandhu et al. | ............... 713/155 |
| 2002/0087860 | A1 | | 7/2002 | Kravitz | |
| 2002/0095507 | A1 | | 7/2002 | Jerdonek | |
| 2002/0095569 | A1 | | 7/2002 | Jerdonek | |
| 2003/0084304 | A1 | | 5/2003 | Hon et al. | |

(Continued)

FOREIGN PATENT DOCUMENTS

WO     03/063411     7/2003

OTHER PUBLICATIONS

Messmer, E., "Authentication services on tap," NetworkWorld, Sep. 27, 2004, p. 35.

(Continued)

*Primary Examiner*—Taghi T Arani
*Assistant Examiner*—Jason Lee

(57) ABSTRACT

To authenticate a user having an associated asymmetric crypto-key having a private/public key pair (D,E) based on a one-time-password, the user partially signs a symmetric session key with the first portion D1 of the private key D. The authenticating entity receives the partially signed symmetric session key via the network and completes the signature with the second private key portion D2 to recover the symmetric session key. The user also encrypts a one-time-password with the symmetric session key. The authenticating entity also receives the encrypted one-time-password via the network, and decrypts the received encrypted one-time-password with the recovered symmetric session key to authenticate the user.

21 Claims, 10 Drawing Sheets

U.S. PATENT DOCUMENTS

| | | |
|---|---|---|
| 2003/0115452 A1* | 6/2003 | Sandhu et al. .............. 713/155 |
| 2003/0135739 A1 | 7/2003 | Talton, Sr. |
| 2004/0008845 A1 | 1/2004 | Le et al. |
| 2005/0050330 A1 | 3/2005 | Agam et al. |
| 2005/0132192 A1 | 6/2005 | Jeffries et al. |

OTHER PUBLICATIONS

Anderson, et al., "A New Family of Authentication Protocols", Cambridge University Computer Laboratory, England, pp. 9-20.

Basney, et al., "A Roadmap for Integration of Grid Security with One-Time Passwords", May 21, 2004, pp. 1-10.

Bicakici, et al., "One-Time Passwords: Security Analysis Using BAN Logic and Integrating with Smartcard Authentication", Middle East Technical University, 2003, pp. 794-801.

Halevi, et al., "Public-key Cryptography and Password Protocols", 1998, pp. 122-131.

E Week, The Enterprise Newsweekly, Sep. 20, 2004.

J. Gaskin, "Eliminate static passwords; CryptoCard offers guaranteed two-factor authentication security", Aug. 8, 2005, pp. 1-2.

C. Garretson, "IronPort looks to be e-mail's guardian", Enterprise Applications, Sep. 27, 2004.

E. Wine, "Another Obstacle for Hackers to Scale", The Fitness Report, Jun. 2005.

Gale Group, "Aladdin Granted Second U.S. Patent for Utilizing USB-Based Portable Devices", PR Newswire, Sep. 7, 2004.

Gale Group, "VeriSign Licenses Mobile Tokens and Mobile Authentication Services from Diversinet", Business Wire, Jun. 28, 2005.

Gale Group, "Settlement Agreement Affirms Aladdin's Rights Over USB Token Patent", PR Newswire, Jun. 29, 2005.

* cited by examiner

PROTECTING ONE-TIME-PASSWORDS AGAINST MAN-IN-THE-MIDDLE ATTACKS

RELATED APPLICATIONS

This application claims priority based on Provisional U.S. Application Ser. No. 60/677,408, filed May 4, 2005, and entitled "PROTECTING ONE TIME PASSWORDS AGAINST MITM ATTACKS", the contents of which are incorporated herein by reference.

TECHNICAL FIELD

This invention relates to cryptography. More particularly, the present invention relates to split key asymmetric cryptography using a one-time password.

BACKGROUND ART

Today, computing devices are almost always interconnected via networks. These networks can be large closed networks, as within a corporation, or truly public networks, as with the Internet. A network itself might have hundreds, thousands or even millions of potential users. Consequently it is often required to restrict access to any given networked computer or service, or a part of a networked computer or service, to a subset of the users on the public or closed network. For instance, a brokerage might have a public website accessible to all, but would like to only give Ms. Alice Smith access to Ms. Alice Smith's brokerage account.

Access control is an old problem, tracing its roots to the earliest days of computers. Passwords were among the first techniques used, and to this day remain the most widely used, for protecting resources on a computer or service.

Multifactor Password Authentication

Multiple factor authentication exists as a potential solution to the problems inherent with single factor password authentication. In multiple factor password authentication, at least knowledge of, if not actual possession of, two or more factors, at least one of which comes from a password, must be shown for authentication to be complete. It should be understood that in multiple factor password authentication, each factor remains separate. That is, the factors are not combined. Further, the factors are not even concatenated. Several multiple factor authentication techniques exist, including one time password token techniques, password encrypted computer storage techniques, password secured smart card techniques, and split asymmetric key techniques.

-One Time Password Token Techniques-

In one time password token techniques, two passwords are utilized, one typically being a permanent password associated with the user, and the other being a temporary, one-time use, password generated by a password generator. The permanent password may be optional, and one or more temporary passwords may instead be used. The temporary password has a short finite usable life, such as sixty seconds. At the end of the useable life, another temporary password is generated. An authenticating computer knows each usable password as well as its useable life, based upon algorithms well known to those of ordinary skill in the art. A user transmits both the permanent password (first factor) and a temporary password (second factor) to the authenticating computer which then verifies both passwords. The passwords are transmitted in the clear, thus token techniques are subject to man-in-the-middle (MITM) attacks. MITM attacks are also possible in certain cases where the channel for communicating the password is encrypted, such as when server-side Secure Socket Layer (SSL) is used for this purpose.

-Split Asymmetric Key Techniques-

With asymmetric key cryptography every user is associated with a private/public crypto-key pair, commonly referred to as D and E, which are related by special mathematical properties. These properties result in the following functionality: a message encrypted with one of the two keys can then only be decrypted with the other.

One of these keys for each user is made public and the other is kept private. Let us denote the former by E, and the latter by D. So Alice knows $D_{alice}$, and everyone knows $E_{alice}$. To send Alice the symmetric key K, Bob simply sends ciphertext $C=Encrypt(K,E_{alice})$. Alice, and only Alice (since no one else knows $D_{alice}$), can decrypt the ciphertext C to recover the message, i.e. $Decrypt(C,D_{alice})=K$. Now both Alice and Bob know K and can use it for encrypting subsequent messages using a symmetric key system. Why not simply encrypt the message itself with the asymmetric system? This is simply because in practice all known asymmetric systems are fairly inefficient, and while they are perfectly useful for encrypting short strings such as K, they are inefficient for large messages.

The above illustrates how asymmetric cryptography can solve the key distribution problem. Asymmetric cryptography can also be used to solve another important problem, that of digital signatures. To sign a message M, Alice encrypts it with her own private key to create $S=Encrypt(M,D_{alice})$. She can then send (M,S) to the recipient who can then decrypt S with Alice's public key to generate M', i.e. $M'=Decrypt(S, E_{alice})$. If M'=M then the recipient has a valid signature as only someone who has $D_{alice}$, by definition only Alice, can generate S, which can be decrypted with $E_{alice}$ to produce M. To convey the meaning of these cryptographic operations more clearly they are often written as $S=Sign(M,D_{alice})$ and $M'=Verify(S,E_{alice})$. It is worth noting that asymmetric key digital signatures provide non-repudiation in addition to the integrity and authentication achieved by symmetric key MACs (Message Authentication Codes). With MACs the verifier can compute the MAC for any message M of his choice, since the computation is based on a shared secret key. With digital signatures this is not possible since only the sender has knowledge of the sender's private key required to compute the signature. The verifier can only verify the signature, but not generate it. It will be recognized by those skilled in this art that there are numerous variations and elaborations of these basic cryptographic operations of symmetric key encryption, symmetric key MACs, asymmetric key encryption and asymmetric key signatures.

The RSA cryptosystem is one system that implements asymmetric cryptography as described above. In particular, the RSA cryptosystem allows the same private-public crypto-key pair to be used for encryption and for digital signatures. It should be noted that there are other asymmetric cryptosystems that implement encryption only e.g., ElGamal, or digital signature only, e.g., DSA. Technically the public key in RSA is a pair of numbers E, N and the private key is the pair of numbers D, N. When N is not relevant to the discussion, it is commonplace to refer only to the public key as E and the private key as D.

Finally, the above description does not answer the important question of how Bob gets Alice's public key $E_{alice}$. The process for getting and storing the binding [Alice, $E_{alice}$] which binds $E_{alice}$ to Alice is tricky. The most practical method appears to be to have the binding signed by a common trusted authority. Such a "certificate authority" (CA) can create $CERT_{alice}=Sign([Alice, E_{alice}], D_{ca})$. Now $CERT_{alice}$ can be verified by anyone who knows the CA's public key $E_{ca}$. So in essence, instead of everyone having to know everyone else's public key, everyone only need know a single public key, i.e. that of the CA. More elaborate schemes with multiple Certificate Authorities, sometimes having a hierarchical relationship, have also been proposed.

Asymmetric key cryptosystems have been around for a long time, but have found limited use. The primary reasons are twofold: (a) the private key D in most systems is long, which means that users cannot remember them, and they have to either be stored on every terminal a user uses, or carried around on smart cards or other media; and (b) the infrastructure for ensuring a certificate is valid, which is critical, is cumbersome to build, operate, and use. The first technique proposed to validate certificates was to send every recipient a list of all certificates that had been revoked. This clearly does not scale well to an environment with millions of users. A later technique proposed to validate certificates was to require that one inquire about the validity of a certificate on-line, which has its own associated problems.

Split Asymmetric Key Cryptography

A system based on split asymmetric key cryptography has been developed to solve these two issues, i.e. long private keys and certificate validity, among others. In this system the private key for Alice, i.e. $D_{alice}$, is further split into two parts, a part $D_{aa}$ which Alice knows, and a part $D_{as}$ which is stored at a security server, where $D_{aa}*D_{as}=D_{alice}$ mod$\Phi$(N). To sign a message, Alice could perform a partial encryption to generate a partial signature, i.e. PS=Sign(M,$D_{aa}$). Alice then sends the server PS which 'completes' the signature by performing S=Sign(PS,$D_{as}$). This completed signature S is indistinguishable from one generated by the original private key, i.e. $D_{alice}$, so the rest of the process works as previously described. However, $D_{aa}$ can be made short, which allows the user to remember it as a password, so this system is user friendly. Further, if the server is informed that a particular ID has been suspended or revoked, then it will cease to perform its part of the operation for that user, and consequently no further signatures can ever be performed. This provides for instant revocation in a simple, highly effective fashion. It will be recognized by those skilled in the art that a split private key can be used in a similar manner for decryption purposes, and that the partial signatures (or encryptions) may be performed in the reverse sequence, that is first by the security server and subsequently by the user's computer, or may even be performed concurrently in both places and then combined.

Authentication Using Split Key Asymmetric Cryptography and the Secure Socket Layer (SSL)

Let us return now to password based systems. Challenge-response systems solve the issue of having to send passwords in the clear across a network. If the authenticating computer and Alice share a secret password, P, then the authenticating computer can send her a new random challenge, R, at the time of login. Alice computes C=Encrypt(R,P) and sends back C. The authenticating computer computes Decrypt(C,P)=C'. If C=C', then the authenticating computer can trust that it is Alice at the other end. Note however that the authenticating computer had to store P.

A more elegant solution can be created using asymmetric cryptography. Now Alice has a private key $D_{alice}$, or in a split private key system she has $D_{aa}$. The authenticating computer challenges her to sign a new random challenge R. She signs the challenge, or in the split private key system she interacts with the security server to create the signature, and sends it back to the authenticating computer which uses her public key, retrieved from a certificate, to verify the signature. Observe that the authenticating computer does not have to know her private key, and that an eavesdropper observing the signature on R gains no knowledge of her private key.

-Server Side SSL-

The secure socket layer (SSL) system, which is widely used on the Internet, in effect implements a more elaborate version of exactly this protocol. SSL has two components, 'server side SSL' in which a server proves its identity by correctly decrypting a particular message during connection set-up. As browsers, such as Netscape and Microsoft Internet Explorer, come loaded with the public keys of various CAs, the browser can verify the certificate of the server and use the public key therein for encryption. This authenticates the server to the client, and also allows for the set-up of a session key K, which is used to encrypt and MAC all further communications. Server side SSL is widely used, as the complexity of managing certificates rests with system administrators of web sites who have the technical knowledge to perform this function.

-Client Side SSL-

The converse function in SSL, client side SSL, which lets a client authenticate herself to a server by means of a digital signature, is rarely used. This is because although the technical mechanism is much the same, it now requires users to manage certificates and, unless they use a split private key, long private keys, which has proven to be difficult. So in practice, most Internet web sites use server side SSL to authenticate themselves to the client, and to obtain a secure channel, and from then on use Userid, Password pairs to authenticate the client.

So far from disappearing, the use of passwords has increased dramatically. Passwords themselves are often dubbed as inherently "weak". This is inaccurate because, if they are used carefully, passwords can actually achieve "strong" security. As discussed above, passwords should not be sent over networks, and if possible should not be stored on the receiving computer. Instead, in a "strong" system, the user can be asked to prove knowledge of the password without actually revealing the password. Perhaps most critical is that passwords should not be vulnerable to dictionary attacks.

Vulnerability of Passwords to Phishing by Impostor Website and Man-In-The-Middle (MITM) Attacks As noted above, users are often required to submit their user IDs and passwords as credentials to a website, in order to authenticate themselves to the website. In such cases, an attacker who gains access to a user ID and associated password, can impersonate the user from the attacker's or any other terminal.

-Impostor Website Attacks-

In practice users often have no absolute guarantee that the website to which they submit these credentials, is in-fact the website with which the user intends to communicate. This is because, while the website might look and feel like the intended website, e.g. the website of an Internet Service Provider (ISP) or some well-known e-commerce website such as an on-line bank or merchant, it could in-fact actually be an imposter website which has been set-up by an attacker to have the look and feel of the real website of the entity with whom the user wishes to communicate. This type of attack is commonly referred to as a form of "phishing".

If a user submits her credentials to the imposter website, an attacker could then use the submitted credentials to gain access to the user's confidential information and take advantage of the user's relationship with the real website and perhaps even other websites with which the user has registered the same credentials. For example, an attacker gaining access to the user's credentials could potentially transfer securities or money from the user's brokerage or bank account, and/or purchase products or services via the user's merchant account.

There are many ways for an attacker to fool a user into providing her credentials to an imposter website. For example, an attacker can send out a large number of e-mails inviting the user to logon to a well-known e-commerce website, such as paypal.com, but having a link to the website paypai.com, hoping that the recipient of the e-mail is registered at the financial website paypal.com. The attacker intends to capitalize on the fact that, although the last letter in the link to the imposter website is 'i' rather than "l", this distinction will be overlooked by the user and the user will activate the link. The web pages provided by the imposter website paypai.com are then made to look like those at the real website paypal.com. Thus, the user, viewing the impostor website after activating the link, may have no reason to suspect that the website is not the real paypal.com website. The user may therefore submit the credentials she has registered with the real paypal.com website, e.g. the user's ID and password, to the imposter website in an attempt to login. At this point, the user's credentials are captured by the imposter website. The attacker can then login to the real paypal.com website using the user's ID and password, and authorize or revoke transactions associated with the user's account, potentially even moving money into an account controlled by the attacker.

Thus, not only can the attacker mislead the user into believing that a imposter website is authentic, the attacker can mislead a real website into believing that the attacker is authentic, by using the user's credentials, i.e. the user's user ID and password, to authentic to the real website, resulting in the real website believing it is dealing with the user when in-fact it is dealing with the attacker.

The attacker might alternatively provide the user a link containing what appears on the user's display monitor to be a URL of the real website, e.g. paypal.com, but is in-fact a link to an imposter website. For example, the user may see a link that reads "http://" appended to www.paypal.com.%sdafghdgk% . . . which appears to be a link to the real website paypal.com with a long list of parameters that extend off the end of the URL window in the user's browser. However, unseen by the user, is that this link actually terminates with ". . . @paypa1.com". Thus when the user activates the link with a click of the user's mouse, the user is in-fact linked to the imposter website. The imposter website can then, operate as above to obtain the user's credentials for the real website.

-Man-In-The-Middle (MITM) Attacks-

Although the use of an imposter website is a common means for an attacker to gain access to a user's user ID and password, these credentials can also be obtained by an attacker launching a man-in-the-middle (MITM) attack. For example, if the user's ID and password are stored on the user's terminal, an attacker may gain access to these credentials, from the user's own terminal. Furthermore, a sophisticated attacker may be able to capture the user's ID and password during the transmission of these credentials to the intended website. In either case, the attacker can then present the user ID and password to a website to successfully authenticate the attacker to that website. Thereafter the attacker simply sits in the middle transmitting the data between the user and the website and possibly modifying it as needed to achieve the attacker's goals. The attacker can also close the user side of the connection and continue to impersonate the user to the website. This type of MITM attack is also commonly referred to as a form of "phishing".

True Protection Against MITM and Impostor Website Attacks Using Multifactor Split Key Asymmetric Cryptography In order to have true protection against phishing, the authentication must be end to end and there must be nothing that an attacker can capture using either an MITM attack or imposter website that can be used by the attacker to demonstrate knowledge of the credentials required to impersonate the real user in subsequent authentications to a real website. Thus, for true protection against phishing attacks, even if the attacker persuades the user to divulge user credentials or otherwise gains access to user credentials, or gains access to the user's network device, the attacker will not be able to reuse the user's credentials or operate the user's device to impersonate the user.

-Armored Credential Systems Using Multi-Factor Split Key Asymmetric Cryptography- A system has recently been developed which provides true protection against phishing attacks. More particularly, as disclosed in U.S. application Ser. No. 11/055,987, filed Feb. 14, 2005, and entitled "ARCHITECHTURE FOR ASYMMETRIC CRYPTO-KEY STORAGE", Tricipher, Inc, the assignee of all rights in the present application, has developed an asymmetric cryptosystem in which users are associated with an asymmetric crypto-key pair having a public key and a private key, at least one of which, e.g. the private key, is split into multiple key portions, e.g. multiple private key portions. As in the conventional split key asymmetric cryptosystems discussed above, each of the key portions can be applied to an original message separately or in sequence and the partial results combined to form a transformed, i.e. encrypted, message, and the other key, e.g. the public key, can be applied to the transformed message to verify authenticity of the message preferably by recovering the original message, which authenticates the user. Conversely a message transformed, i.e. encrypted, with the other key, e.g. the public key, can be decrypted by applying each of the split key portions, e.g. the private key portions, to the transformed message separately or in sequence and the partial results combined to decrypt the original message.

However, unlike the other split key asymmetric cryptosystems, the Tricipher system can generate at least one of the multiple key portions of the asymmetric crypto-key using one or more pieces of information, known as factors. For purposes of the following discussion, we will assume that the private key is split and that a first private key portion of the asymmetric crypto-key is generated using the one or more factors. If multiple factors are used, two, three, or even a greater number of factors can be used, as may be desired under the circumstances. In any event, each of the factors is under the control of a single entity. That is, a single entity has possession of, or free access to, each of the one or more factors. The system preferably uses the RSA algorithm and therefore whether three or more keys are used, the system can retain all the desirable security properties of the two key RSA system, while being stronger than conventional two key RSA systems in significant respects.

At the most basic level, sometimes referred to as single armoring, a portion of the split key is computed using only a single factor corresponding to the password. In single armored mode, the user is associated with a password that is input by the user and expanded using an encryption algorithm, preferably one complying with the PKCS5 IETF standard, to generate a factor. Because the password is expanded in accordance with an encryption algorithm to create the factor, the factor is sometime referred to as a 'hardened password'. In single armored mode the factor itself serves as the applicable portion of the split key. At the next level, sometimes referred to as double armoring, the split key is computed using both the factor corresponding to the password and another factor. At the final level, sometimes referred to as triple armoring, a portion of the split key is computed using the factor corresponding to the password, plus two other factors. In triple armor mode, each user is associated with a password, and two additional asymmetric crypto-key pairs.

In double armored and triple armored mode, knowledge of the password alone is insufficient for authentication, because additional factors are required for authentication. Furthermore, the authentication is end to end, and there is nothing that an attacker's website can capture which will give the attacker knowledge of all the credentials necessary for authentication because the protocols require the attacker to demonstrate possession of credentials that are not actually transmitted to the imposter website but are required to construct the cryptographic keys used to establish the credentials. Thus, even if the attacker is able to set up a website that looks like the intended website or attempt to launch a MITM attack, the attacker will not be able to obtain and demonstrate possession of the crypto-key credentials, or the underlying credentials necessary to construct the applicable key, and therefore will not be able to successfully impersonate the user. Because of all this, double and triple armored mode can provide true phishing protection.

-One-Time-Password Protection Against MITM and Impostor Website Attacks-

A wide variety of one-time-password (OTP) techniques have been proposed to enhance protection against MITM and impostor website attacks. However, all of the proposed techniques have tended to have (i) a shared-secret between the user and the authenticating entity, (ii) a challenge that both entities agree on, (iii) a response which both entities compute independently using an identical process and the shared-secret, e.g. Process(challenge, shared secret)=>response, with this process having the property that an attacker cannot derive the shared-secret even if the attacker observes several pairs of (challenge, response), and that the challenge varies with each use and is never repeated, (iv) authentication which requires the user to simply type the correct response, i.e. the OTP, say into a web page that is presented on the display of the user's PC and is then transmitted to another entity, such as a sponsor or merchant represented by a server at a website, which in turn communicates the response from the user to the authenticating entity, e.g. a distinguished server, which in turn independently computes the correct response, i.e. the OTP, and if it matches with the response from the user, tells the other entity, e.g. the sponsor or merchant represented by the server at the sponsor or server website, that it is likely the user is authentic.

Conventional One-Time-Password Techniques

Exemplary characteristics of four common but different types of OTP techniques are described below.

In time-synchronous type OTP techniques, the shared secret is a large random number, such as a symmetric crypto-key. The challenge is the time at that instant, e.g. the time when authentication is requested. The user has a token, typically a physical device that computes a new response every minute based on Process (shared-secret, time). The technique works by requiring the user to type in the response, i.e. the OTP, currently flashing on token, which is sent to the relying entity, which is depicted as a system, e.g. the sponsor or merchant server, which has to communicate the received response to the OTP authenticating entity, e.g. a distinguished server, which independently computes the response, and tells relying entity if the response from the user is correct.

In challenge-response type OTP techniques, the shared secret is a large random number. The challenge is a number the OTP authenticating entity, e.g. the distinguished server, sends the user, preferably directly. The user has a token into which the user types in the challenge sent by the authenticating entity. The token computes a response based on typed in challenge. The technique works by requiring the user to type in the computed response, i.e. the OTP, and send the computed response to the relying entity, e.g. the sponsor or merchant server, which communicates the received response to the authenticating entity, e.g. the distinguished server, which independently computes a response and tells other entity if the response from the user is correct.

In paper based type OTP techniques, the shared secret is a grid of numbers. The challenge is a set of coordinates for one or more cells in the grid that the authenticating entity, e.g. the distinguished server, sends the user, preferably directly. The user has a paper with the grid of numbers and the authenticating entity also has a copy of the grid. The technique works by requiring the user to type in the numbers in the appropriate cell(s) corresponding to the set of coordinates in the received challenge, and sends the typed in the numbers, i.e. the OTP, as a response to the other entity, e.g. the sponsor or merchant server. The other entity has to communicate the received numbers to the authenticating entity, e.g. the distinguished server, which independently determines the numbers in the appropriate cell(s) corresponding to the set of coordinates from its copy of the grid and tells the other entity if the response is correct.

In OATH and OATH Standard type OTP techniques, the shared secret is again a large random number. The challenge is the value of a counter that is incremented with each use. The user has a token that computes a new response every minute based on Process (shared-secret, counter). The technique works by requiring the user to type in the response currently flashing on token and send the typed in response, i.e. the OTP, to the relying entity, e.g. the sponsor or merchant server. The relying entity communicates the received response to the authenticating entity, e.g. the distinguished server, which independently computes a response and tells other entity if the response from the user is correct.

On the surface it appears that since the response, i.e. the OTP, changes with each use, that OTPs protect against phishing. However, the phisher does not really care about the password, the phisher wants access to the other entity's website. So, as shown in FIG. 11, the phisher could simply launch a MIMT attack which lures the user to a web proxy and then proxy all traffic between the user and the intended website, e.g. the website of a sponsor server or a merchant server.

The phisher can then achieve one of three goals:

If the goal of the phisher is to log into a sponsor or merchant server, the phisher can store the session cookies as they pass through the proxy, copy the stored cookies to the phisher's own network device, e.g. the phisher's PC, and use the stored cookies to log into a desired server, e.g. a sponsor or merchant server. Observe that this attack requires zero sophistication. All that is required of the phisher is the ability to set up a web proxy and copy cookies.

If the goal is to hijack the session, the phisher need only change the proxy website slightly so that the user's 'logoff' message does not go through to intended website, e.g. the website of a sponsor server or a merchant server, and then keep 'refreshing the session' to keep the cookies valid. The phisher can then, at leisure, hijack the session.

If the goal is to pervert certain transactions, for instance to change a user's order for stock ABC to an order for stock XYZ, phisher need only slightly change the proxy website in a different way and the user will dutifully provide the OTP needed to confirm the transaction! An actual attack of exactly this nature was written using a freeware proxy server and two lines of PERL. And observe that this-is completely automated.

Attacks that have already been reported make OTPs useless by themselves as a defense against phishing. To reiterate, such proxy in the middle attacks are extremely simple and will certainly be likely to be used by a phisher targeting a bank or e-commerce site.

The key to preventing such attacks is to use authentication techniques that have the following two properties. First, the authentication technique must not reveal secrets. That is, the "secret" must never leave the user's PC, but rather some "proof" of the secret is sent to the authenticating entity. Second, the "proof" should be such that interference of a MITM will be detected by the authenticating entity, e.g. the distinguished server.

Most genuine websites already use server side SSL to authenticate themselves to the user's browser and to set up an encrypted channel. Of course one major reason for phishing is that browser designs did not do a good job of using the server side SSL verification to convey to the user that (i) they are on protected site, and (ii) which site they are on. All the browser vendors have already announced plans, and some have already implemented early plans, to improve this situation. Unfortunately this, in and of itself, will not suffice to quell phishing. There are two reasons for this. First, such awareness techniques still require the user to be alert, and in general the users most likely to be phished are those who tend to be "unconscious and unaware". Second, most phishers to our knowledge currently do not obtain server side SSL certificates, and rely on the fact that the end user does not notice that they are not at a "protected site". However, obtaining a 'server side certificate' under the name of a company that "sounds like" the genuine company from one of the now very many "trusted" roots browsers ship with, is not likely to thwart a determined phisher.

So while better use of server side SSL certificates is welcome, it does not by itself resolve the issue, and client authentication is needed. In case this is not clear, it should be understood that even with server side SSL certificates it is possible for a phisher who obtains such a fake SSL server certificate to get the user to sign the running hash between the user's browser and the phisher. However, this will be useless to the phisher in signing into the genuine website if client authentication is also used.

Proposed One-Time-Password Techniques Using Out-Of-Band Communications

The use of out-of-band communications has been proposed to enhance protection against MITM attacks in systems relying on one-time-passwords. Here the notion is that by using two separate communications channels, e.g. the browser-server connection via an Internet channel and an SMS cell phone or similar other connection via a telephone network channel, one can thwart a MITM attack because the phisher will find it more difficult to hijack two channels rather than just one channel. While such an approach would enhance protection, it may be attractive to only a narrow class of applications, and therefore lacks broad applicability. Further, while such an approach has the advantage of being 'non PC invasive', i.e. no client side software is required and hence it does not require a footprint on the user's network device, it is significantly 'human invasive', i.e. the high dudgeon over 'client software', which is a one time deployment event, would seem altogether overdone if replaced with a mechanism that creates a constant nuisance for the user over an ongoing period for every authentication.

Proposed One-Time-Password Techniques Using Legacy PKI

The use of the legacy public key infrastructure (PKI) has also been proposed as having the capability to enhance protection against MITM attacks in systems relying on one-time-passwords. Legacy PKI, if used correctly, can prevent MITM attacks, and it has been suggested that OTPs can be safely transmitted within a secure channel created using legacy PKI. However, in addition to the other reasons, some of which have been noted above, that legacy PKI has failed to find widespread acceptance and use, even if legacy PKI were implemented in a way in which MITM attacks are prevented, it would remain vulnerable to problems on the back-end integration of the OTPs.

Proposed One-Time-Password Techniques Using a Password Protection Module

Still another proposal has been offered by RSA Laboratories, the research center of RSA Security Inc. The details of this proposal can be found at www.rsasecurity.com/.../bios/bkaliski/publications/other/kaliski-authentication-risk-readiness-bits-2004.ppt). According to the proposal by RSA Labs, every application has an application specific identifier (ASI), e.g. a URL. The browser of the user network device, e.g. the user's PC, catches this identifier, and securely hands it to a password protection module (PPM) which, as understood, is located either outside the user network device operating system or in a very secure part of the operating system. This PPM queries the user for the OTP and hashes it with the ASI. The hash is then handed back by the PPM to the browser of the user network device, which in turn transmits the received hash to a relying entity which is depicted as a system, e.g. a sponsor or distinguished server. The relying entity then transmits the returned hash to the authenticating entity, depicted as a Proprietary RSA server. To validate the returned hash, the authenticating entity must execute proprietary software that independently calculates the hash based on a priori knowledge of the OTP and the ASI. If the hash received from the browser of the user's network device and the calculated hash are a match, then the user is authenticated.

The proposed technique certainly eliminates, at least at this time, the risk of any practical MITM attack, with the exception of a phisher installing software on the user network device that seeks to spoof the "hands it" process identified above. However, the keyword here is "practical". If the user's browser has the ability to reliably determine the real address, e.g. the real Universal Resource Locator (URL), of the website to which it is submitting the hashed-OTP, in other words if the URL of the MITM is exposed to the browser, and used to construct the hashed-OTP, then-the hashed-OTP will be useless and will fail. This is because, if the URL of the MITM is exposed to the user's browser, the MITM will receive the OTP hashed with the MITM website's URL. Thus, if the MITM tries to use this hashed-OTP at the legitimate site, it will be rejected. However, even if at present it is likely that the user's browser will be able to reliably determine the real address of the website to which it is submitting the hashed-OTP, whether or not this will continue to be the case as MITM attacks become ever more sophisticated remains questionable.

On the other hand if the MITM can fool the user's browser into believing that the URL of the MITM website with which the browser is communicating is the URL of the legitimate website to which the browser desires to communicate then the hashed-OTP will be useful at the real site and MITM attack will succeed. This is because, if the URL of the MITM is not exposed to the user's browser, the MITM will receive the OTP hashed with the intended website's URL. Thus, if the MITM uses this hashed-OTP at the legitimate site, it will be accepted.

For example, some of the techniques used in MITM attacks that attempt to grab a raw OTP, i.e. a non-hashed OTP, will typically reveal the URL of the MITM website to the user's browser. These techniques rely on the user not recognizing the rogue URL of the MITM. Other techniques used in MITM attacks tamper with the Domain Name System (DNS) and IP routing infrastructure, and seek to misdirect the user's browser to the MITM website, but with the same URL as the intended legitimate website. So hashed-OTPs will foil some MITM attacks but not others. While the attacks which cannot be foiled using RSA's PPM may be deemed impractical at this time, such attacks are, at least in theory, doable and could become much more likely to be used by phishers in the future. Thus, while the hashed-OTPs used in the proposed RSA PPM will raise the bar, these hashed-OTPs, will not necessarily protect against all MITM attacks.

Thus, while the ASI emulates, to some extent, the functionality present in SSL to prevent man in the middle, it cannot fully protect against all types of MITM attacks. Furthermore, while the protected area on the user's network device is certainly something that any mechanism can take advantage of, why RSA's proposed PPM should do hashing of the OTP instead of digital signing is not clear. Further still, the RSA PPM requires added instructions on the user network device, i.e. requires a footprint on the user network device, which puts it on par with any other solutions requiring a client download that tend to be unacceptable to users and/or sponsors. Indeed, the technique requires fundamental changes to the commercially available web browser commonly installed on today's user network devices. Additionally, the technique also requires changes to the authenticating entity network station. Additionally, the proposed the RSA PPM does nothing about addressing the back-end risk of password files being stolen or the theft of seeds from insecure software. Although such back-end attacks are rarer than garden variety phishing, they are catastrophic when they are successful because all user credentials are compromised. Finally, since the proposed RSA PPM requires that the hash be different for each application, e.g. one hash is used to access the user's brokerage account and a different hash is used to access the user's bank account, the PPM makes single sign-on more difficult.

In summary, hashing a OTP using the PPM proposed by RSA Labs, requires the execution of a new proprietary browser interface on the user's network device, e.g. a user's PC, and therefore requires a change to existing browser standards, such as CAPI/PKCS11. The RSA proposal also requires the execution of new proprietary software by the authenticating entity station, e.g. a sponsor or distinguished entity server, rather then utilizing existing SSL software. The proposed system is also subject to catastrophic back end risks, and requires a change in the conventional OTP processing in order to hash the OTP with an ASI.

Thus, while the RSA Labs' proposed OTP hashing technique using a PPM solves some of the problems with conventional OTP techniques and the other proposed enhancements to such conventional techniques, a need remains for an OTP technique that overcomes at least some of the problems with the RSA proposed technique.

OBJECTIVES OF THE INVENTION

It is an object of the present invention to provide a one-time-password authentication technique with enhanced protection against MITM attacks. It is also an object of the present invention to overcome at least some of the deficiencies of other one-time-password authentication techniques that have been proposed to address the problem of MITM attacks to which conventional one-time-password techniques are subject. Additional objects, advantages, novel features of the present invention will become apparent to those skilled in the art from this disclosure, including the following detailed description, as well as by practice of the invention. While the invention is described below with reference to a preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

A user of a communications network, such as the Internet or other network, having an associated asymmetric crypto-key pair, such as an RSA asymmetric crypto-key pair, can be securely authenticated based on a one-time-password (OTP). More particularly, with the private key D, of the private/public asymmetric crypto-key pair D,E, split into a first private key portion D1 and a second private key portion D2, the user partially signs a symmetric session key with the first private key portion D1. The authenticating entity, which could be a sponsor, merchant or distinguished entity, receives the partially signed symmetric session key from the user via the network. The authenticating entity completes the signature on the received partially signed symmetric session key with the second private key portion D2 to recover the symmetric session key. It will be understood that completion of a signature may also require the application of the public key E, if the public key E was not applied by the user in forming the partial signature. Furthermore, completion of a signature could additionally require the application of the other portions of the private key D, if the private key is split into more than portions D1 and D2, and any other such portion was not applied in forming the partial signature. This understanding will apply through the remainder of this application. The user encrypts a OTP with the symmetric session key to form what is sometimes referred to as a protected one-time-password (POTP). The authenticating entity receives the encrypted OTP, from the user via the network, and decrypts the received encrypted OTP with the recovered symmetric session key. The user is then authenticated based on the decrypted OTP.

Preferably, the user is also authenticated based on the recovery of the symmetric session key by the authenticating entity. If so, there are multiple levels of user authentication. At one level, the user is authenticated by proving knowledge of the private key portion D1, i.e. knowledge of the user portion of the split private key, while at another level, the user is authenticated by proving knowledge of the OTP.

Beneficially, the authenticating entity partially signs the recovered symmetric session key with the second private key portion D2, and this partially signed symmetric session key is received by the user from the authenticating entity via the network. If such a case, the user can complete the signature on the received partially signed symmetric session key with the first private key portion D1 to recover the symmetric session key, and authenticate the authenticating entity based on the recovery of the symmetric session key.

According to other preferred, i.e. optional, aspects of the invention, only after authenticating the user based on the decrypted one-time-password, will the authenticating entity partially sign a relying party authenticating message with the second private key portion D2, i.e. the authenticating entity portion of the split private key. The relying party authenticating message is the message being sought by a relying party, e.g. a merchant, which will authenticate the user to the relying party. The relying party authenticating message could, for example, take the form of a secure socket layer (SSL) hash, e.g. client side SSL hash of prior messages communicated between the user and the relying party. The user receives the partially signed relying party authenticating message from the authenticating entity, e.g. a sponsor or distinguished entity, via the network. The user further signs the received partially signed relying party authenticating message with the first private key portion D1, which as previously noted is the user portion of the split private key, and transmits the further signed relying party authenticating message to the relying party via the network. The relying party authenticating message is recoverable by applying the public key E to the further signed relying party authenticating message. Hence, the relying party can recover the relying party authenticating message with the user's public key in order to authenticate the user.

According to another preferred implementation of the invention, the private key D of the associated asymmetric crypto-key pair is also split into a third private key portion D3 corresponding to the one-time-password. In this case correspondence of D3 to the OTP is to the underlying random seed from which the OTP is computed. D3 could be this seed itself or some function of the seed, preferably a one-way function. If so, the user can determine the third private key portion D3, and partially sign the symmetric session key also with the determined third private key portion D3, in addition to the first private key portion D1 as noted above. In such a case, the authenticating entity can recover the symmetric session key from the partially signed symmetric session key with the second private key portion D2.

Alternatively, if the user partially signs the symmetric session key with only the first private key portion D1, the authenticating entity can determine the third private key portion D3 or otherwise obtain it and also apply the determined third private key portion D3, in addition to the second private key portion D2 as noted above, to complete the signature on the received partially signed symmetric session key to recover the symmetric session key.

According to still other preferred aspects of the invention, the user receives a challenge, e.g. a number, from an authenticating entity via the network, and partially signs the received challenge with the first private key portion D1. In some implementations, the user may also determine the one-time-password based on the received challenge. For example, this might be the case if a challenge-response OTP token is used by the user to determine the OTP. In any event, the authenticating entity receives the partially signed challenge from the user via the network, and completes the signature on the received partially signed challenge with the second private key portion D2 to recover the challenge. The authenticating entity can then authenticate the user based on the recovery of the challenge.

In still another preferred implementation, not only is the private key D of the associated asymmetric crypto-key pair also split into a third private key portion D3 that corresponds to the one-time-password, but additionally the third private key portion D3 is further split into a fourth private key portion D4 and a fifth private key portion D5. In accordance with this implementation, the authenticating entity identifies a number as the fourth private key portion D4, and partially signs the recovered symmetric session key with the second private key portion D2, i.e. the authenticating entity's portion of the split private key, and the fourth private key portion D4. The user receives the partially signed symmetric session key and the fourth private key portion D4 from the authenticating entity via the network. The user determines the fifth private key portion D5 based on the third private key portion D3 and the received fourth private key portion D4. The user can then complete the signature on the received partially signed symmetric session key with the first private key portion D1 and the determined fifth private key portion D5 to recover the symmetric session key, and authenticate the authenticating entity based on the recovery of the symmetric session key.

In an exemplary networked system implementation the user is represented by a user network device, which could be a personal computer (PC), cell phone, iPod, or any other network capable device that is suitably configured with the necessary logic to perform the required functions, and the authenticating entity is represented by a authenticating entity network device, which could be a server, e.g. a sponsor, merchant or distinguished entity server, or any other network capable device that is suitably configured with the necessary logic to perform the required functions. The user network device, most typically the processor of the user network device, partially signs the symmetric session key with the first private key portion D1, and also encrypts the one-time-password with the symmetric session key. The user network device also transmits the partially signed symmetric session key via the network, and the encrypted one-time-password via the network. In this regard, these transmissions are most typically directed by the device processor and performed by a network interface, such as a modem or other type interface to the communications network.

The authenticating entity network device receives, e.g. over its network interface, the transmitted partially signed symmetric session key and the transmitted encrypted one-time-password. The authenticating entity network device, e.g. the device processor, also completes the signature on the received partially signed symmetric session key with the second private key portion D2 to recover the symmetric session key, and then decrypts the received encrypted one-time-password with the recovered symmetric session key. The authenticating entity network device, e.g. the device processor, can then authenticate the user based on the decrypted one-time-password.

Preferably, the authenticating entity network device processor also is configured to authenticate the user based on the recovery of the symmetric session key, to partially sign the recovered symmetric session key with the second private key portion D2, and to direct transmission of the partially signed symmetric session key via the network. Again the transmission is typically performed by a network interface which makes the transmission in accordance with the processor directive. In such a case, the user network device is further configured to receive the transmitted partially signed symmetric session key over its network interface. The user network device processor can then complete the signature on the received partially signed symmetric session key with the first private key portion D1 to recover the symmetric session key, and authenticate the authenticating entity based on the recovery of the symmetric session key.

Advantageously, the authenticating entity network device processor is further configured to partially sign a relying party authenticating message with the second private key portion D2, and direct its transmission via the network, but only after authenticating the user based on the decrypted one-time-password. Here again the transmission is typically make by the device network interface in accordance with the device processor directive. If so, the user network device interface is further configured to receive the transmitted partially signed relying party authenticating message. The user network device processor further signs the received partially signed relying party authenticating message with the first private key portion D1, and directs its transmission to a relying party via the network. Here again, the network interface of the user network device will typically perform the transmission in accordance with the processor directive. As note above, the relying party authenticating message is recoverable by completing the signature on the further signed relying party authenticating message with the public key E.

In the implementation in which the private key D is also split into a third private key portion D3 corresponding to the one-time-password, the processor of the user network device is further configured to determine the third private key portion D3, and to partially sign the symmetric session key also with the determined third private key portion D3. However, alternatively processor of the authenticating entity network device can be further configured to determine the third private key portion D3, and to complete the signature on the received partially signed symmetric session key also with the determined third private key portion D3 to recover the symmetric session key.

Optionally, the authenticating entity network device is further configured to transmit, by way of its network interface, a challenge via the network. If so, the user network device is further configured to receive the transmitted challenge at its network interface. The processor of the user network device partially signs the received challenge with the first private key portion D1, and directs transmission of the partially signed challenge via the network, which is carried out by the network interface. In some implementations the device processor will determine the one-time-password based on the received challenge. In any event, the authenticating entity network device is further configured to receive the partially signed challenge at its network interface. The processor of the authenticating entity network device can complete the signature on the received partially signed challenge with the second private key portion D2 to recover the challenge, and authenticate the user based on the recovery of the challenge.

In the still other implementation in which not only is the private key D also split into a third private key portion D3 that corresponds to the one-time-password, but D3 is further split into a fourth private key portion D4 and a fifth private key portion D5, the processor of the authenticating entity network device is further configured to identify the number as the fourth private key portion D4, and partially sign the recovered symmetric session key with the second private key portion D2 and the fourth private key portion D4. The processor of the authenticating entity network device is further configured to direct the transmission of the partially signed symmetric session key and of the fourth private key portion D4 via the network, which is carried out by its network interface. The user network device is further configured to receive the transmitted partially signed symmetric session key and the transmitted fourth private key portion D4 over its network interface. The processor of the user network device is further configured to determine the fifth private key portion D5 based on the third private key portion D3 and the received fourth private key portion D4, and to complete the signature on the received partially signed symmetric session key with the first private key portion D1 and the determined fifth private key portion D5 to recover the symmetric session key. The processor of the user network device can then authenticate the authenticating entity based on the recovery of the symmetric session key.

PREFERRED EMBODIMENT(S) OF THE INVENTION

The Network Architecture

Figure 1:
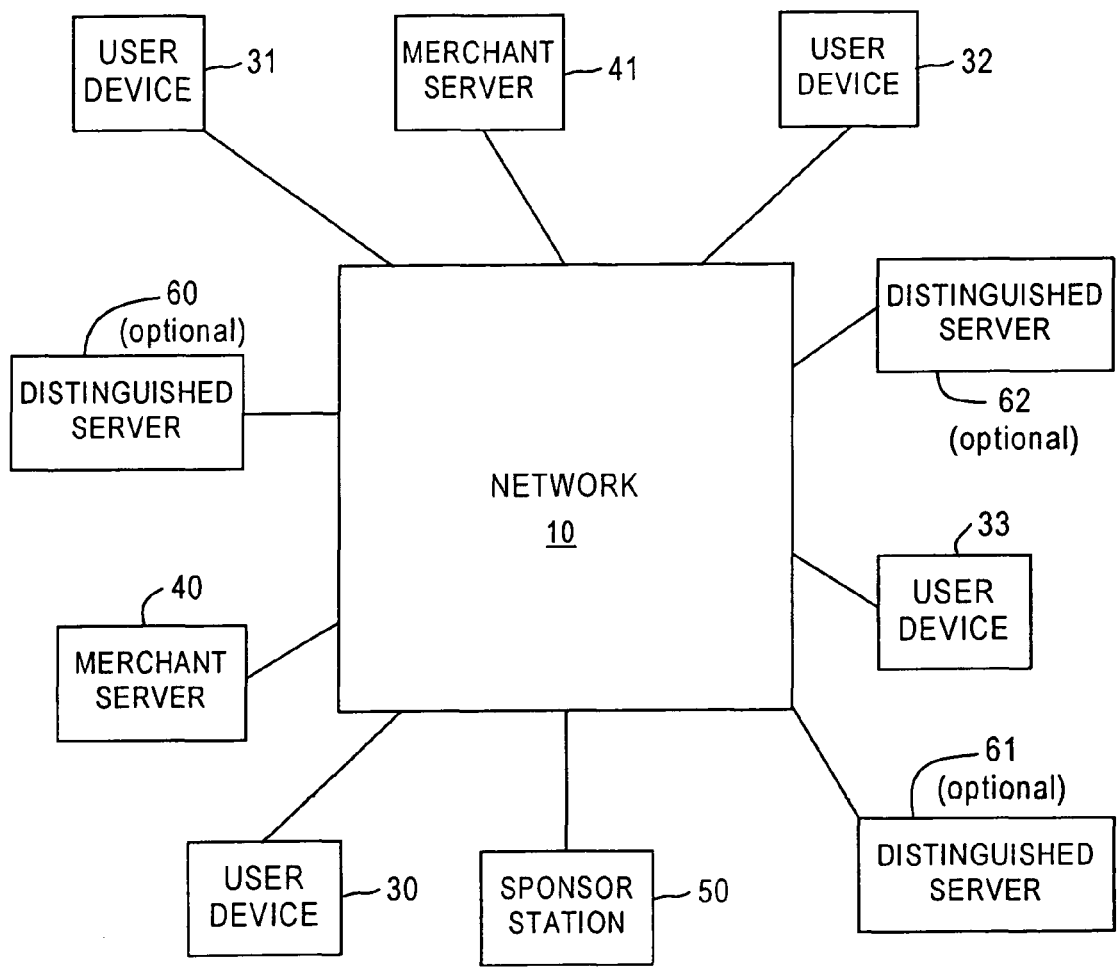
FIG. 1 depicts an exemplary network, including networked devices associated with users, a sponsor, merchants, and optional distinguished entities, in accordance with the present invention.

FIG. 1 illustrates a network 10, which could be the Internet or another public or private network. As shown, the network 10 includes multiple network devices interconnected so as to be capable of communicating with each other. These network devices include network devices 30-33 associated with individual users, network devices 40-41 associated with merchants, a network device 50 associated with a sponsor, and optional network devices 60-62 associated with entities known to and trusted by the sponsor. These later entities are sometimes referred to as distinguished entities.

User network devices 30-33 are typically personal computers, but could be other types network devices. Merchant network devices 40-41 could be associated with any type entity having a presence, e.g. a web page, on network 10, and typically take the form of network, e.g. Internet, servers. Accordingly, the merchant network devices 40-41 will sometimes be referred to as merchant servers. The sponsor network device 50 also typically takes the form of a network server, and will sometimes be referred to as a sponsor server or sponsor station. Likewise, the optional distinguished entity network devices 60-62 typically take the form of network servers. Accordingly, the optional distinguished entity network devices 60-62 will sometimes be referred to as distinguished servers. It will be understood that a network may consist of more network devices than depicted in FIG. 1.

The User Network Device

Figure 2:
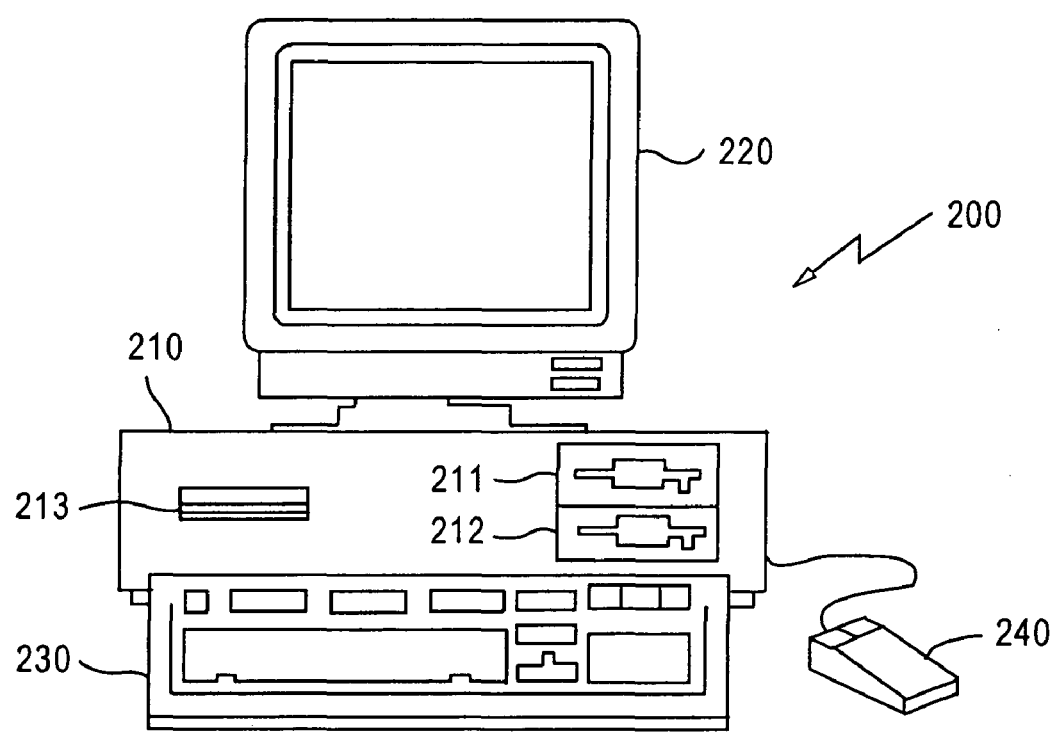
FIG. 2 depicts a computer suitable for use by a user to access a network, in accordance with the invention.
Figure 3:
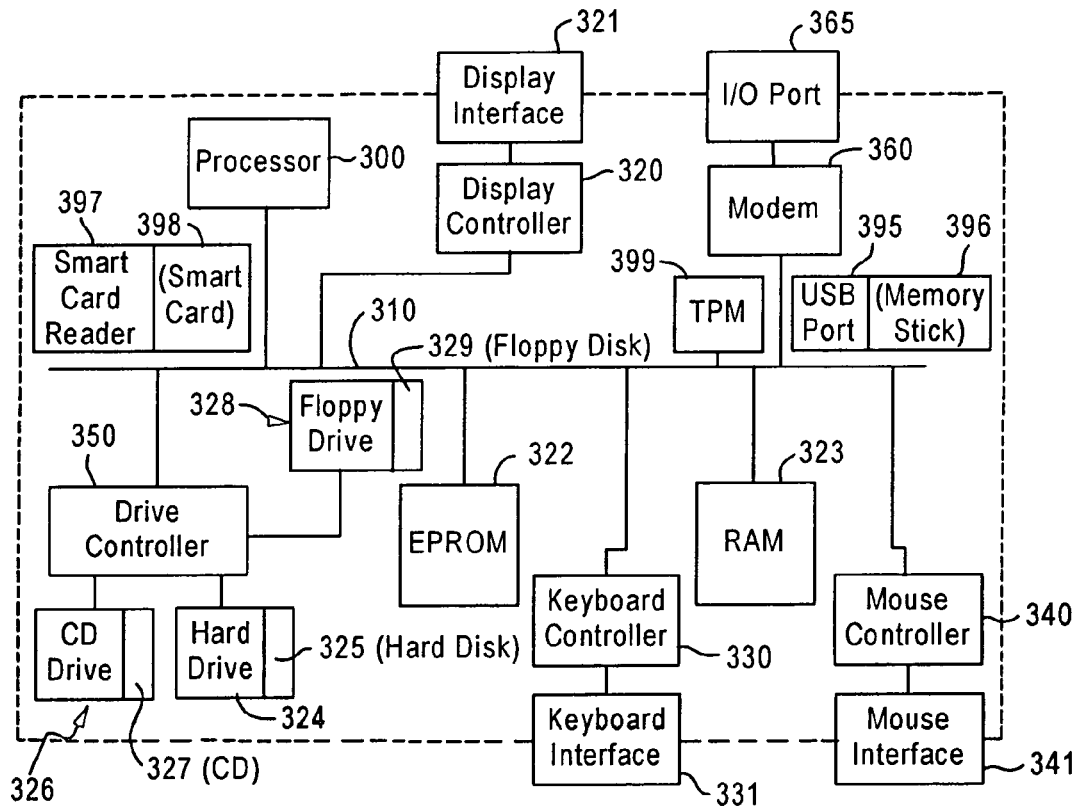
FIG. 3 is an exemplary block diagram of components of the computer depicted in FIG. 2.

FIGS. 2 and 3 depict an exemplary personal computer (PC) suitable for use by an individual user as a user network device 30-33 to access the network 10. The PC is preferably a commercially available personal computer. It will be recognized that the PC configuration is exemplary, and that other components (not shown) could be added or substituted for those depicted and certain of the depicted components could be eliminated if desired. Further, a user device 30-33 could be another type device, i.e. a device other than a personal computer, such as, but not limited to, a personal digital assistant (PDA) or a mobile phone, e.g. cellular or other type wireless communications device.

The PC or other type user network device functions in accordance with stored programmed instructions, which are sometimes characterized as logic, that are executed, drive its operation. Preferably, the computer stores its programmed instructions on an EPROM, or hard disk. It will be recognized that only routine programming is required to implement the instructions required to drive the computer to operate in accordance with the invention. Further, since the computer components and configuration are well understood by those skilled in the art, routine operations performed by depicted components will generally not be described, such operations also being well understood in the art.

Referring to FIG. 2, the computer 200 includes a main unit 210 with slots 211, 212, and 213, respectively provided for loading programming or data from a floppy disk, compact disk (CD), or other removable media, onto the computer 200. The computer 200 also includes a keyboard 230 and mouse 240, which serve as user input devices. A display monitor 220 is also provided to visually communicate, i.e. display, information to the user.

As depicted in FIG. 3, the computer 200 has a main processor 300 which is interconnected via bus 310 with various remote or local storage devices which may include, but are not limited to, erasable programmable read only memory (EPROM) 322, read only memory (RAM) 323, hard drive 324, which has an associated hard disk 325, CD drive 326, which has an associated CD 327, floppy drive 328, which has an associated floppy disk 329, USB port 395 for connecting a universal serial bus (USB) drive 396 (often called a flash drive or memory), and smart card reader 397 for communicating with a smart card 398. Also shown in FIG. 3 is a trusted processing module (TPM) 399 for securely storing cryptographic keys. Taken together, the remote and local storage devices will be referred to collectively as storage devices 370.

A drive controller 350 controls the hard drive 324, CD drive 326 and floppy drive 328. Also depicted in FIG. 3 is a display controller 320 interconnected to display interface 321, a keyboard controller 330 interconnected to keyboard interface 331, a mouse controller 340 interconnected to mouse interface 341 and a modem 360 interconnected to I/O port 365, all of which are connected to the bus 310. The modem 360 and interconnected I/O port 365, serve as a network interface, and are used to transmit and receive signals via the network 10 as described herein. Those skilled in the art will recognize that another type of network interface could be easily substituted for that shown. It should also be understood that, if desired, other components could be connected to the bus 310, or that less than all the components shown in FIG. 3 could be connected to the bus 310. By accessing and executing the stored computer programming, i.e. the stored programmed instructions, the processor 300 is driven to operate in accordance with the present invention.

The Sponsor, Merchant and/or Distinguished Entity Network Device

As noted above, the sponsor network device 50, each merchant network device 40-41 and each optional distinguished network device 60-62 is typically represented on network 10 by a network server. However, here again, any network compatible device which is capable of functioning in the described manner could be utilized in lieu of a server to represent the associated entity, i.e. the sponsor, each merchant and/or each optional distinguished entity, on the network.

Figure 4:
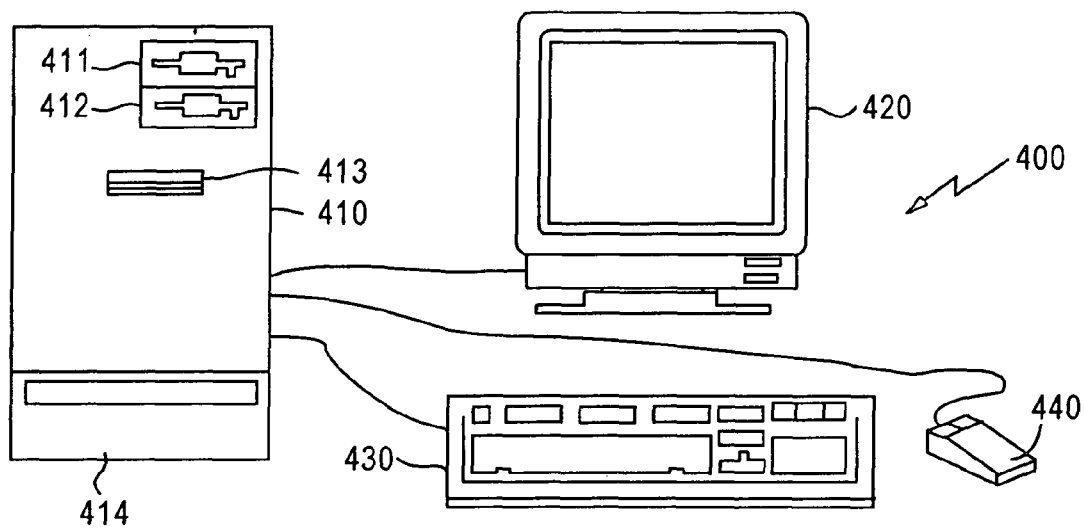
FIG. 4 depicts a server suitable for use by a sponsor, a merchant, and/or an optional distinguished entity, in accordance with the present invention.
Figure 5:
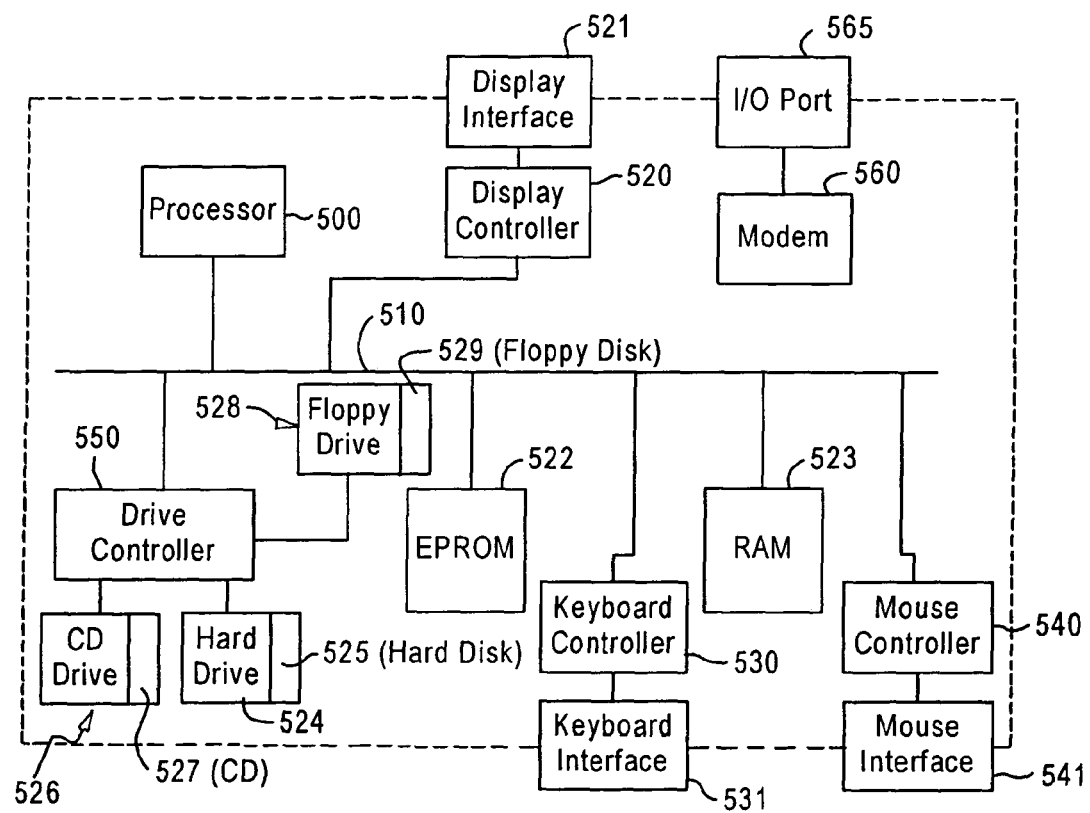
FIG. 5 is an exemplary block diagram of components of the server depicted in FIG. 4.

FIGS. 4 and 5 depict an exemplary network server suitable for use by the sponsor, merchants, and optional distinguished entities to access the network 10 in accordance with the invention. The server is preferably a commercially available, high power mini-computer or mainframe computer. Here again, it will be recognized that the server configuration is exemplary, and that other components (not shown) could be added or substituted for those depicted and certain of the depicted components could be eliminated if desired.

The server functions as described below in accordance with stored programmed instructions, i.e. logic, which drive its operation. Preferably, the server stores its unique programmed instructions on an EPROM or hard disk. It will be recognized that only routine programming is required to implement the instructions required to drive the server to operate in accordance with the invention. Further, since the server components and configuration are well understood to those skilled in the art, routine operations performed by depicted components will generally not be described, such operations also being well understood in the art.

Referring to FIG. 4, the server 400 includes a main unit 410 with slots 411, 412, 413 and 414, respectively provided for loading programming or data from a floppy disk, CD and/or hard disk onto the server 400. The server 400 also includes a keyboard 430 and mouse 440, which serve as user input devices. A display monitor 420 is also provided to visually communicate, i.e. display, information to the applicable entity. As depicted in FIG. 5, the server 400 has a main processor 500 which is interconnected via bus 510 with various storage devices including EPROM 522, RAM 523, hard drive 524, which has an associated hard disk 525, CD drive 526, which has an associated CD 527, and floppy drive 528, which has an associated floppy disk 529. The memories, disks and CD all serve as storage media on which computer programming or data can be stored for access by the processor 500. The stored data includes one or more databases containing information associated with network users or other network entities. Taken together, the storage devices will be referred to collectively as storage devices 570.

A drive controller 550 controls the hard drive 524, CD drive 526 and floppy drive 528. Also depicted in FIG. 5 is a display controller 520 interconnected to display interface 521, a keyboard controller 530 interconnected to keyboard interface 531, a mouse controller 540 interconnected to mouse interface 541 and a modem 560 interconnected to I/O port 65, all of which are connected to the bus 510. The modem 560 and interconnected I/O port 565 serve as a network interface and are used to transmit and receive signals via the network 10 as described herein. Those skilled in the art will recognize that another type of network interface could be easily substituted for that shown. It should also be understood that, if desired, other components could be connected to the bus 510, or that less than all the components shown in FIG. 5 could be connected to the bus 510. By accessing the stored computer programming, the processor 500 is driven to operate in accordance with the present invention.

Overview

As has been discussed above, it is recognized that conventional techniques for using one-time-passwords (OTPs) authentication are subject to man-in-the-middle (MITM) phishing attacks. As will be described in detail below, a new technique has now been developed, taking advantage of both multifactor split key asymmetric cryptography and the existing SSL infrastructure that allows for OTP authentication with enhanced protection against man-in-the-middle (MITM) phishing attack. The technique not only provides users and authenticating entities that wish to use OTPs for user authentication with greater protection against MITM phishing attacks, it does so without problems found in previously proposed OTP authentication techniques.

Key to any OTP authentication technique preventing MITM attacks, is for that the technique to have two properties. First, the authentication technique must not reveal secrets. That is, the "secret" must never leave the user's PC. Instead some "proof" of the secret, rather than the secret itself, must be sent to the authenticating entity. Second, the "proof" should be such that interference of a MITM by proxy attack will be detected by the authenticating entity, e.g. a sponsor, merchant or distinguished server.

-User Authentication Via Client Side SSL-

It is worthwhile to note again here that a very elegant system to achieve exactly these two properties exists today in almost every browser and web server—namely the client authentication in the SSL infrastructure, sometimes referred to as client side SSL, that is ubiquitous and widely deployed, i.e. installed, but seldom used. In client side SSL, the authenticating entity, e.g. the sponsor or distinguished entity server, and the user, e.g. the user network device, jointly agree on a running hash that needs to be signed, i.e. "proof" is created on the user network device. Critically, this running hash contains the authenticating entity's certificate. The running hash at a point in time is the hash of all SSL handshake messages exchanged till that point in time. We refer the interested reader to IETF Request for Comments: 2246 The TLS Protocol for a detailed explanation of SSL. The use of the client side SSL infrastructure will completely eliminate MITM attacks by proxy, which are possible if only server side SSL protection is used.

However, as noted above, client side SSL is rarely used at present, because until recently such use required the deployment of legacy PKI digital certificate systems in order to perform the "signing" of the running hash that client authentication via client side SSL mandates. As those skilled in the art are aware, legacy PKI digital certificate systems are very difficult to properly implement from an operational standpoint and are "usability" challenged.

-User Authentication Via Split Key Asymmetric Cryptography-

In split key asymmetric cryptography, at least one of the private key and the public key is split into multiple key portions. Thus, if a private key D of an asymmetric crypto-key is split into two key portions, e.g. a first private key portion $D_1$ and a second private key portion $D_2$, where $D_1 * D_2 = D$ mod $\Phi(N)$, and the public key E of the asymmetric crypto-key is not split, a message encrypted with E, can only be decrypted using both the first private key portion $D_1$ and the second private key portion $D_2$. Thus, with the split private key, ciphertext M is CM=Encrypt(M,E) and the to recover M one must perform Decrypt(CM, $D_1 * D_2$)=M.

However, in order to have true protection against phishing, the authentication must be end to end and there must be nothing that an attacker can capture using either an MITM attack or imposter website that can be used by the attacker to demonstrate knowledge of the credentials required to impersonate the real user in subsequent authentications to a real website. Thus, for true protection against phishing attacks, the attacker will not be able to reuse the user's credentials to impersonate the user.

As has also been discussed above, U.S. application Ser. No. 11/055,987 discloses how to use multifactor split key asymmetric cryptography with what are commonly referred to as armored credentials to provide true protection against MITM, including those by proxy, and other forms of phishing attacks. According to the techniques disclosed in the '987 application, each user is associated with an asymmetric crypto-key pair having a public key and a private key, at least one of which, e.g. the private key, is split into multiple key portions, e.g. multiple private key portions. At least one of the multiple key portions of the asymmetric crypto-key is generated using more pieces of information, known as factors. Two, three, or even a greater number of factors can be used, as may be desired under the circumstances. In any event, each of the factors is under the control of a single entity. That is, a single entity has possession of, or free access to, each of the one or more factors.

For example, if the private key is split, the user Alice is associated with the first private key portion $D_{aa}$, the authenticating entity, e.g. a sponsor, merchant or distinguished entity server, has control of the second private key portion $D_{as}$, and there are only two private key portions, the first and second private key portions of the asymmetric crypto-key are combinable to form a complete private key $D_{alice}$. This private key is usable to transform, e.g. encrypt or decrypt, messages as may be desired under the circumstances. The public key, commonly designated as $E_{alice}$, is preferably available to at least one other entity.

$D_{aa}$ is preferably generated using multiple factors, each of the multiple factors will be under the control of the applicable entity, which in this example is the user Alice. Preferably, one of the factors corresponds to the user's password, i.e. could be the user's password itself or some function of the user's password, another of the multiple factors could be a factor stored on the user's network device or removable media configured to communicate with the user's network device. A factor stored on a user's network device is sometimes referred to as $D_{tether}$ and a factor stored on removable media is sometimes referred to as $D_{USB}$.

-Removing the Barriers to Adoption of Client Authentication in SSL-

As will be described further below, in accordance with the present invention, the barriers to adoption of client authentication in SSL are removed using two innovations.

First, in multifactor split key cryptography every user credential is a multipart credential, one part, e.g. $D_{aa}$ with the user, and the other $D_{as}$ stored securely by the authenticating entity. For example, $D_{as}$ can be stored on a FIPS 140-1 Level 2 device by the authenticating entity, such as at a sponsor, merchant or distinguished entity network station.

Second, when the "signature" needs to be performed on the running hash, (i) the user authenticates to the authenticating entity. Additionally, (i) the authenticating entity performs a partial signature using $D_{as}$, and (ii) the user, represented for example by a user network device, such as a user PC with executable logic that we commonly refer to as the ID Tool (IDT), completes the signature with $D_{aa}$, or vice versa.

$D_{aa}$ is preferably derived (i) from password and data stored in the non-exportable Windows key store, (ii) from password and data stored on a USB memory stick, (iii) from password and data stored on any removable disk system, including iPods, digital cameras, etc., (iv) from password and data stored on a smartcard, (v) from password and data stored on a Trusted Platform Module (TPM) chip built into the motherboard of a PC. However, $D_{aa}$ could be the password or some other value itself, or could be derived in some other way, if so desired. Accordingly, credentials of many different strengths can be deployed from a single authentication infrastructure, and in all cases the relying entity simply turns on SSL, or IPSEC or any other protocol that requires a client certificate, with client authentication and does not have to be deal with the cumbersome revocation infrastructures such as Certificate Revocation Lists (CRLs) or certificate validation using OCSP or other validation protocols.

MITM Protection Using a Protected One Time Password (POTP)

-How it Works-

The present invention leverages multi-factor split key asymmetric cryptography to resolve the MITM problems faced by conventional and other proposed systems that use OTPs. Further, it achieves this without any proprietary software on the authenticating entity or any relying entity web server by also leveraging the existing SSL infrastructure.

In summary, an authenticating entity server, e.g. a sponsor, merchant or distinguished entity server, turns on client side SSL, which invokes client authentication in the user's network device, e.g. in the browser executing on the user's PC, which in turn invokes what we refer to as the ID Tool (IDT), which is simply a CAPI or PKCS11 compliant driver. The authenticating entity server, e.g. the sponsor, merchant or distinguished entity server, also requests the user's network device to sign the SSL running hash. The user network device, executing the IDT, returns the SSL hash signed with $D_{aa}$ to the browser, which in turn returns it to the authenticating entity server, which verifies the signatures.

Based on the above exchange, a non-phishable secure protected tunnel, which will be described further below, is established between the user network device executing the IDT, and the authenticating entity server.

The user is prompted to enter the OTP value on the user network device. The entered OTP value is delivered to the authenticating entity server via the protected tunnel. The authenticating entity server verifies if the OTP value is correct. If, and only if, the OTP value is correct, will the authenticating entity server continue processing the request.

-The Protected Tunnel-

As noted above, in POTP authentication the OTP is transmitted between the user network device and the authenticating server via a protected tunnel. It is reasonable to ask if the transmission of the OTP between the user network device and the authenticating entity server can be phished by a MITM. Understanding why this is not possible requires a conceptual understanding of the protocol between the user network device, executing the IDT, and the authenticating entity server.

To answer this question, it will be assumed that all communications between the user network device and the authenticating entity server through a MITM, and described why such a MITM sees no useful information.

The communications between the user network device and the authenticating entity server are as follows.

When the user, e.g. Alice, wants to log in, the user network device, executing the IDT, sends a message to the authenticating entity server, e.g. a sponsor, merchant or distinguished entity server, saying "Alice wants to log in". Let us assume this message goes to a MITM who forwards it on.

The authenticating entity server responds with a challenge, a large, say 512 bit, random number R0. It will be recognized by those with ordinary skill in the art that large in this context means large enough to defeat a exhaustive search of all possible values, and that bit lengths of 128, 168, 192 or 256 are often used. Let us assume this challenge goes to the MITM who records it and sends it on.

The user network device, executing the IDT, receives R0, concatenates it with another large, say a 512 bit, random number R1, and then signs [R0:R1] with the user's portion of the split key, i.e. with $D_{aa}$ to create Sign([R0:R1], $D_{aa}$), which is sent back to the MITM.

What can the MITM do with Sign([R0:R1], $D_{aa}$) message? In order to decrypt the message the attacker needs to Complete_Signature(Sign([R0:R1], $D_{aa}$), with the authenticating entity portion of the split key, i.e. $D_{as}$. However, the MITM does not know $D_{as}$ and, because it is a very large key, the MITM cannot successfully determine it by a brute force search. The only other way the MITM can attempt to recover R1 is to create a Sign[R0:guess for R1, guess for $D_{aa}$]. As R1 is a large, e.g. a 512 bit, number, and $D_{aa}$ is usually derived from a very large key space, such an attack is infeasible. So the unsuccessful MITM can do little else but forward on the message to the authenticating entity server.

Since all further traffic is encrypted with R1, which serves as a symmetric session key and which the MITM does not know, there is now a "protected tunnel" between the user network device, executing the IDT, and the authenticating entity server, making it safe to communicate the OTP to the authenticating entity server. Because the transmission of the OTP is protected by the "protected tunnel" we refer to the OTP as a protected one time password, or POTP.

-Advantages of POTP Cryptography-

The use of a POTP cryptography offers several advantages. First it revitalizes the use of OTPs which would otherwise be at end of life. Second, it does not require any change to convention OTP generating devices or algorithms, etc. Third, conventional and proposed systems that rely on OTP authentication require the use of highly proprietary software at the authenticating entity server, which is a major disincentive to OTP adoption. On the other hand, the above described POTP technique, which will be described in greater detail further below, completely eliminates the need for any proprietary software on the authenticating entity or relying entity server, which need only turn on client side SSL in the existing SSL logic that is already commonly available on user network devices. It will be recognized by those skilled in the art that authenticating entity servers with IPSEC or any other digital signature application can be easily adapted to function in the above described manner.

While there are many advantages to using POTPs, it should be understood that to obtain these advantages requires a CAPI or PKCS11 driver on the user network device, which may in turn require some, albeit light, e.g. <1 MB, footprint on the user network device. However, with the exception of out of band approaches, which have their own challenges, it is not apparent that any solution which is capable of preventing OTPs from being phished by a MITM will not require some client footprint.

-Alternative Implementations-

What the use of POTP achieves is a union of OTPs, with ever changing key values, to PKI type technology, in which the key values remain constant over relatively long periods of time. The POTP can be implemented in various ways. An overview of three exemplary implementations are described immediately below.

Level 1: In this implementation, the digital signature on the appropriate hash is created with $D_{aa}$ and $D_{as}$, as described above. However, the authenticating entity will only cooperate in the signing if, as part of the initial authentication, the user is able to provide the appropriate POTP response. One advantage of this implementation is that the multi-part credential, e.g. $D_{aa}$ and $D_{as}$, and the POTP credential need not be synchronized, thus allowing POTP cryptography to be easily deployed in existing OTP cryptosystems.

Level 2: In this implementation, the multi-part credentials, e.g. $D_{aa}$ and $D_{as}$, need not simply split the signing key into two parts. Rather, there can be an additional number of such parts, where the POTP shared-secret corresponds to one of the signing keys e.g. $D_{alice}$ is split into $D_{aa}$, $D_{as}$ and $D_{POTP}$. This binds the POTP and the multi-part credentials even closer. As with the Level 1 implementation, this implementation can also be easily implemented in existing OTP cryptosystems, as long as the authenticating entity has access to the OTP seed during key-creation of $D_{as}$.

In the Level 1 and Level 2 exemplary implementations, a relying entity, such as a merchant server, may be relying on the authenticating entity, such as a sponsor or distinguished entity server, to ensure that the user correctly enters the POTP. While this is perfectly adequate for any practical purpose of which we are aware, other implementations have been considered to take further advantage of the inherent flexibility of the split key asymmetric cryptography, to create a cryptography that guarantees that the digital signature could not have been produced without the cooperation of the OTP token, as will be generally described below in the simplified descriptions of the exemplary Level 3 implementation.

Level 3: The Level 3 implementation is particularly suitable if a challenge-response OTP token is utilized to generate the OTP. In addition to the multipart credentials, e.g. $D_{aa}$ and $D_{as}$, in this exemplary implementation there is a third part to the multi-part credentials of the user, which we refer to as the "POTP constant" also written as $D_{PTOP}$. All three of these parts need to be used to create a digital signature. The POTP constant may be stored on the challenge-response OTP token. After initial authentication of the user when the authenticating entity is requested to sign a hash, such as a SSL hash, the authenticating entity, e.g. the sponsor or distinguished server, picks a random-number R2, which serves as the challenge, of an appropriate size, for example a 512 bit number, and in addition to signing the SSL hash with $D_{as}$, also signs the hash with $D_{R2}$, where R2=$D_{R2}$, and communicates the partially signed hash, i.e. Sign (SSL hash, $D_{as}$) and $D_{R2}$ to the client network device. The communicated R2 is input to the challenge-response OTP token. The OTP token, which knows the POTP constant, calculates a complement-R2 (CR2) using R2 and the POTP constant. The computed CR2, is then used to sign the partially signed hash, before completing the signature with the $D_{aa}$, so the Complete_Signature=Sign(Sign (Sign(Sign (SSL hash, $D_{as}$), $D_{R2}$) $D_{CR2}$), $D_{aa}$), where CR2=$D_{CR2}$. As will be recognized, $D_{R2}$ and $D_{CR2}$ must be cryptographically related in a fashion that ensures that the ensuing signature is identical to one signed by the POTP-Constant. For example, this can be achieved by $D_{R2}*D_{CR2}=D_{POTP}$ mod phi(n).

While, as noted above, Levels 1 and 2 require no changes to the existing OTP systems and are therefore the most practical today, Level 3 illustrates that multi-part credentials offer even more powerful ways to combine OTPs with the public key infrastructure (PKI).

The POTP cryptography can be easily implemented on an existing OATH compliant OTP server or an existing proprietary OTP authenticating server, e.g. a sponsor, merchant or distinguished server, by reconfiguring the server, using well known techniques, to securely store $D_{as}$ and perform the necessary functions described herein. Such an implementation allows usage of an OATH token, as well as offering safe storage for seeds and eliminating any need for two servers. The POTP cryptography can additionally be easily implemented using an existing OTP server that is maintained separate from an authentication server, e.g. a sponsor, merchant or distinguished server, which has the $D_{as}$ and performs the necessary functions described herein. Such an implementation environment is particularly good for large existing deployments, allows for gradual migration, and preserves the business model of OTP provider companies.

Figure 6:
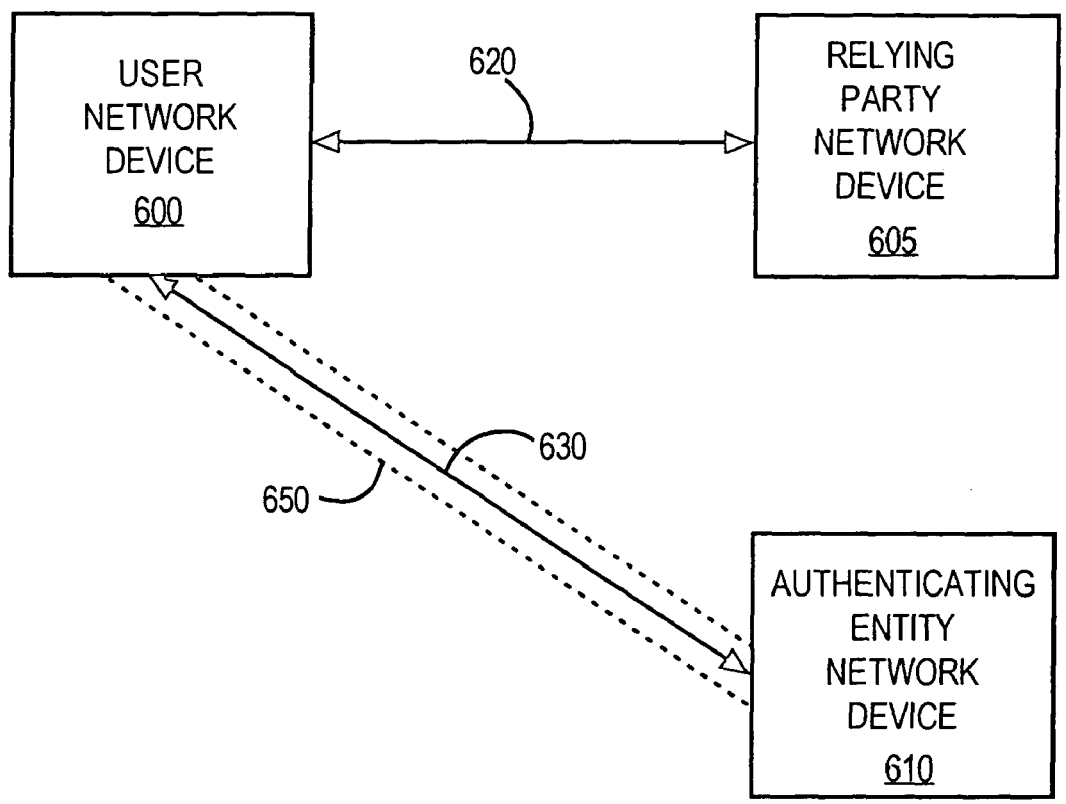
FIG. 6 depicts the communications link between various entities that may participate in authentication using one time passwords, in accordance with the present invention.

-Network Communication Links Between Participating Entities and the Secure Tunnel- FIG. 6 depicts various entities and communications links that may be involved in authenticating a user using POTP.

The user is represented by the user network device 600, which is configured with the necessary logic to function as described below. In this implementation, the user network device 600 is one of the user network devices 30-33 shown in FIG. 1, and takes the form of a personal computer (PC) as described above with reference to FIGS. 2-3. The necessary logic may, for example, be included within a client SSL capable browser and a CAPI or PCKS11 driver loaded on and executable by the PC.

The user is seeking to log-in with a relying party network device 605, which is configured with the necessary logic to function as described below. In this implementation the relying party network device 605 is one of merchant server 40 or 41 shown in FIG. 1, and takes the form of the computing device described above with reference to FIGS. 4-5. The necessary logic can, for example, be included in SSL client authentication software loaded on and executable by the server.

An authenticating entity network device 610, which is configured with the necessary logic to function as described below, will perform the actual authentication. In this implementation the authenticating entity network device 610 is either the sponsor station 50 or one of the distinguished server 60, 61 or 62 shown in FIG. 1, and takes the form of the computing device described above with reference to FIGS. 4-5. As noted above, the authenticating entity network device 610 could be a hardened OATH compliant or an ACE compliant OTP server, or could be linked to an ACE compliant OTP server. In any event the authenticating entity network device 610 is preferably a hardened appliance compliant with FIPS 140-1, Level 2.

As shown, communications between the user network device 600 and the relying party network device 605 are via a two-way communications link 620 which is establish via the network 10 of FIG. 1. Additionally, communications between the user network device 600 and authenticating entity network device 610 are via a communications link 630 within a secure tunnel 650, which is also established via the network 10 of FIG. 1.

-Exemplary Level 1 Implementation-

Figure 7:
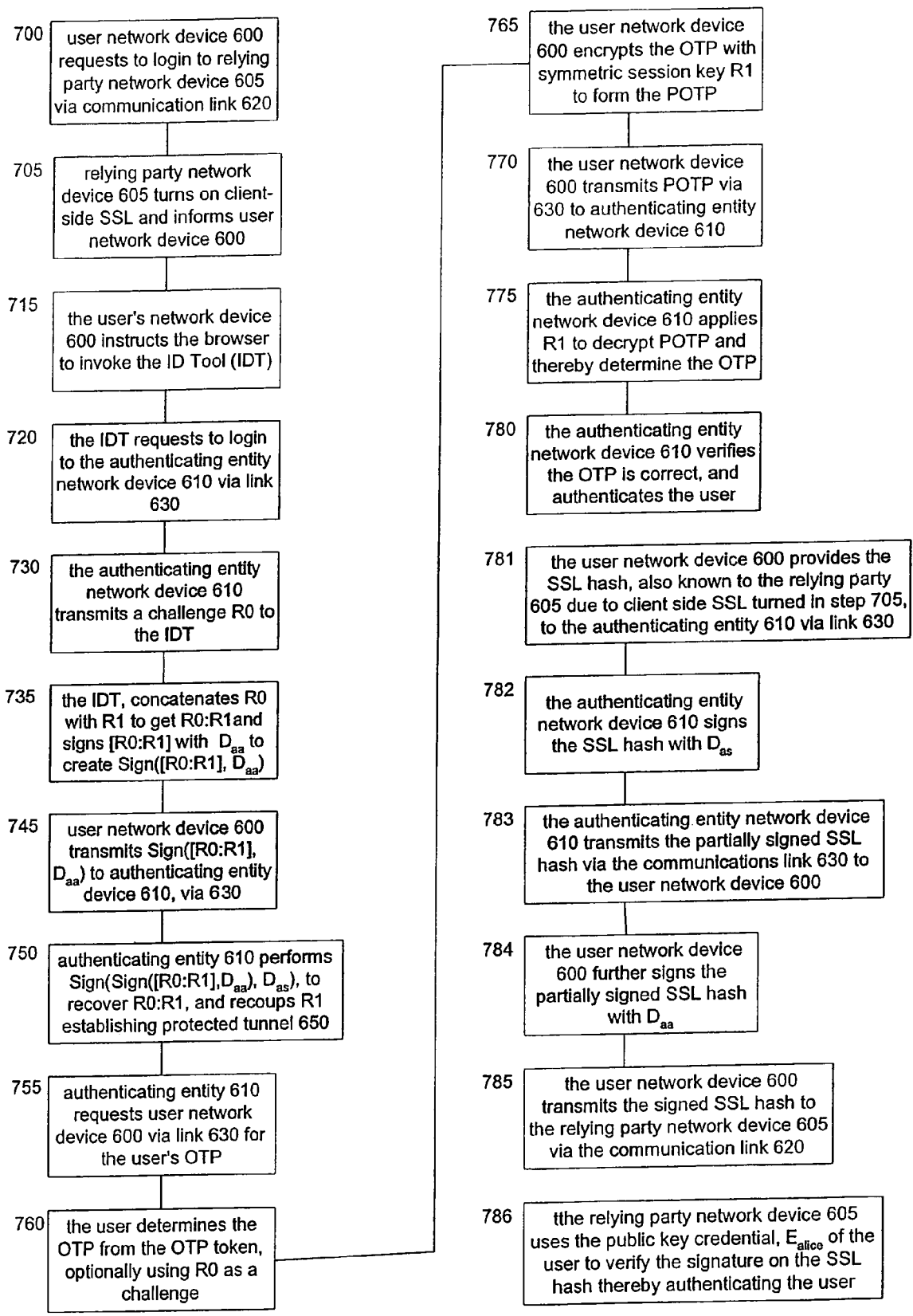
FIG. 7 is a flowchart depicting steps in a first exemplary implementation of the present invention.

The steps required in the Level 1 implementation are shown in FIG. 7, and will be described below with reference also to FIG. 6.

In step 700, the user network device 600 communicates a request to log-in with the relying party network device 605 via the link 620. In step 705, the relying entity network device, in this case a merchant server, turns on client side SSL, which via a communication to the user network device 600 over link 620 invokes client authentication in the user's network device 600. In response, the user's network device

600, step 715, instructs the browser to invoke what we refer to as the ID Tool (IDT), which is simply a CAPI or PKCS11 compliant driver.

If it has not already done so, in step 720 the user's network device 600, executing the IDT, transmits a request to the authenticating entity network device 610 to login via communications link 630 saying, for example, "Alice wants to log in." It should be noted, at this point the protected tunnel identified with reference numeral 650 does not exist.

In step 730, the authenticating entity network device 610 responds with a request, via communications link 630, that the user's network device 600 sign a challenge including a large, say 512 bit, random number R0, which could be a symmetric key or a number determined from a symmetric key using a one-way function. Here again, it should be understood that at this point, the protected tunnel identified with reference numeral 650 does not exist.

After receiving the request and challenge, in step 735, the user network device 600, executing the IDT, concatenates R0 with another large, say a 512 bit, random number R1, and signs [R0:R1] with the user's portion of the split key, i.e. with $D_{aa}$ to create Sign([R0:R1], $D_{aa}$). In step 745, the user network device 600 transmits Sign([R0:R1], $D_{aa}$) to the authenticating entity network device 610, via communications link 630.

After receipt, in step 750 the authenticating entity network device 610 decrypts Sign([R0:R1],$D_{aa}$) by completing the signature. In this regard, the authenticating entity network device 610 performs Sign(Sign([R0:R1],$D_{aa}$), $D_{as}$), to recover R0:R1, and since it knows R0, recoups R1.

Since all further traffic via communications link 630 is encrypted with R1, which serves as a symmetric session key and which the MITM does not know, there is now a protected non-phishable tunnel 650 established between the user network device 600, executing the IDT, and the authenticating entity network device 610, making it safe to communicate the OTP to the authenticating entity network device. Because the transmission of the OTP is protected by the "protected tunnel" 650, the OTP is referred to as a protected one time password (POTP).

In step 755, the authenticating entity network device 610 transmits, via the communications link 630, a request to the user network device 600 for the one time password (OTP).

In response to the request, in step 760, the user determines the OTP from the OTP token, optionally using R0 as a challenge. In step 765, the user network device 600 encrypts the OTP with symmetric session key R1 to form the POTP. In step 770, the user network device 600 transmits, via the communications link 630, the POTP to the authenticating entity network device 610.

After receiving the POTP, in step 775, the authenticating entity network device 610 applies symmetric session key R1 to decrypt POTP and thereby determine the OTP. In step 780, the authenticating entity network device 610 verifies that the OTP is correct, and thereby authenticates the user.

If, and only if, the OTP value is correct, in step 785 the authenticating entity network device 610 authenticates the user network device 600 to the relying party network device 605. This can be done in any of a number of ways, as will be well understood by those skilled in the art. Preferably, in step 781 the user network device 600 provides the SSL hash, also known to the relying party network device 605 as part of the client side SSL turned on in step 705, to the authenticating entity network device 610 via the communications link 630. In step 782 the authenticating entity network device 610 signs the SSL hash with $D_{as}$ and in step 783 transmits the partially signed SSL hash via the communications link 630 to the user network device 600 which in step 784 further signs it with $D_{aa}$ and in step 785 transmits the signed SSL hash to the relying party network device 605 via the communication link 620. In step 786 the relying party network device 605 uses the public key credential, $E_{alice}$ of the user to verify the signature on the SSL hash thereby authenticating the user. In this way, the relying entity network device 605 is not required to have an individual shared symmetric key with the user network device 600 or authenticating entity network device 610 to obtain verification of the user's one time password. This in turn facilitates single sign-on capability, which one time passwords alone do not facilitate because they are based on shared symmetric keys.

As noted above, the Level 1 implementation can verify the OTP using the OATH technology proposed for the IETF standard for one time passwords in IETF Request For Comments 4226 on HOTP: An HMAC-Based One-Time Password Algorithm, in which case authenticating entity network device 610 does not need to go to any other network or other device in order to do verification of the OTP. On the other hand, verification could alternatively be performed using the existing RSA technology, in which case authenticating entity network device 610 would need to go to an RSA server, which is referred to above as the ACE server, in order to verify the OTP, and the authenticating entity network device 610 would communicate with the RSA server as an external back end server. In still another alternative, the RSA server and the authenticating entity network device 610 could be integrated on the same computer.

-Exemplary Level 2 Implementation-

Figure 8:
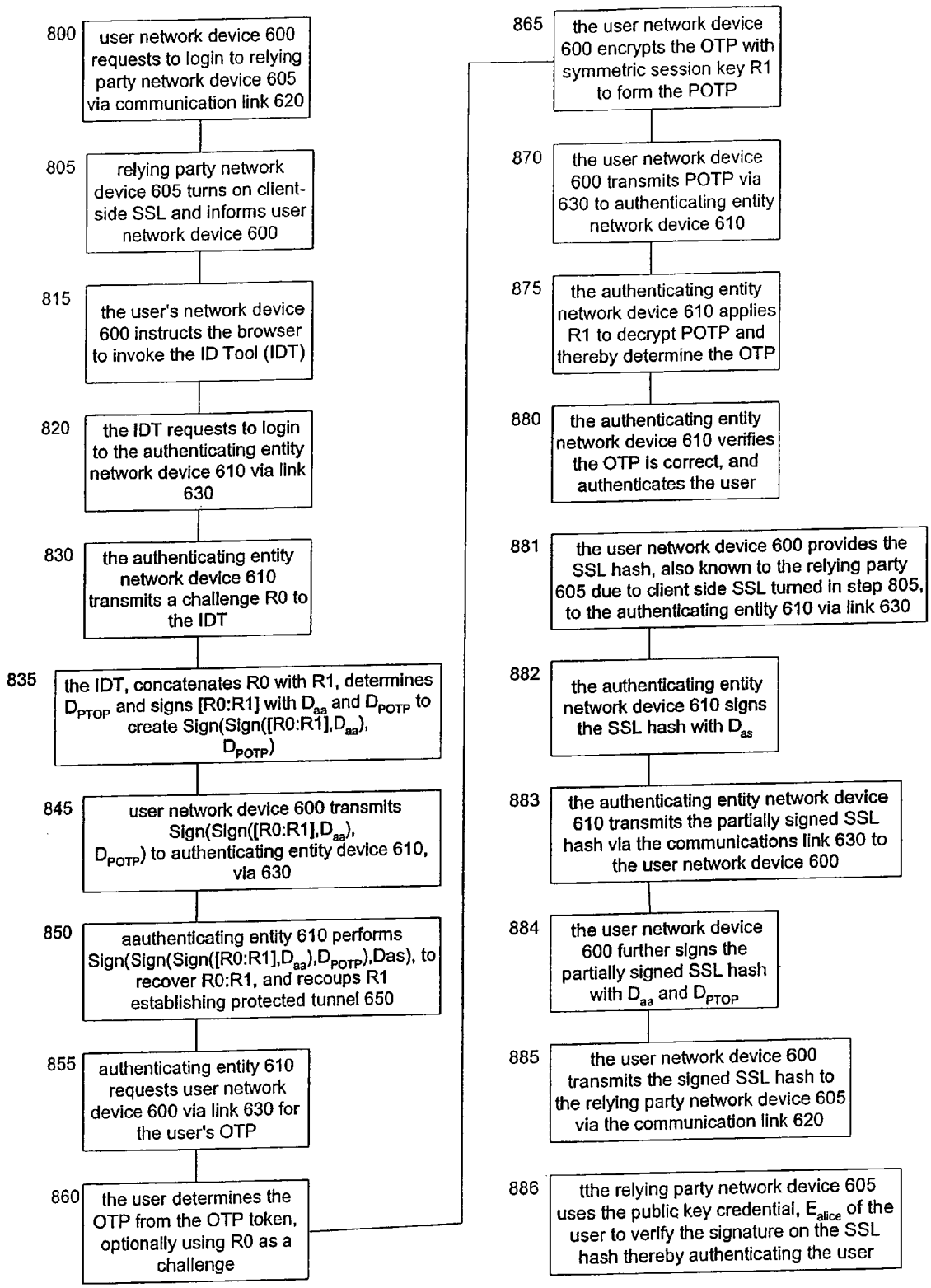
FIG. 8 is a flowchart depicting steps in a second exemplary implementation of the present invention.

The steps required in the Level 2 implementation are shown in FIG. 8, and will be described below with reference also to FIG. 6. As has been noted above, in the Level 2 implementation the split key is split into one or more additional portions, one of which corresponds to the OTP. Thus, in this exemplary implementation $D_{alice}$, is split into a client portion $D_{aa}$, an authenticating entity portion $D_{as}$ and another portion $D_{POTP}$, which corresponds to the OTP. $D_{POTP}$ may be the OTP seed itself or some one-way function of this seed. Hence, in the Level 2 implementation there is greater integration of the OTP with the client side SSL More particularly, in step 800 the user network device 600 communicates a request to log-in with the relying party network device 605 via the link 620. In step 805, the relying entity network device, in this case a merchant server, turns on client side SSL, which via a communication to the user network device 600 over link 620 invokes client authentication in the user's network device 600. In response, the user's network device 600, step 815, instructs the browser to invoke what we refer to as the ID Tool (IDT), which is simply a CAPI or PKCS11 compliant driver.

If it has not already done so, in step 820 the user's network device 600, executing the IDT, transmits a request to the authenticating entity network device 610 to login via communications link 630 saying, for example, "Alice wants to log in." It should be noted, at this point the protected tunnel identified with reference numeral 650 does not exist.

In step 830, the authenticating entity network device 610 responds with a request, via communications link 630, that the user's network device 600 sign a challenge including a large, say 512 bit, random number R0, which could be a symmetric key or a number determined from a symmetric key using a one-way function. Here again, it should be understood that at this point, the protected tunnel identified in FIG. 6 with reference numeral 650 does not exist.

After receiving the request and challenge, in step 835, the user network device 600, executing the IDT, concatenates R0 with another large, say a 512 bit, random number R1 and the user network device 600 determines $D_{POTP}$ and signs [R0:R1] with $D_{aa}$ and $D_{POTP}$ to create Sign(Sign([R0:R1],$D_{aa}$), $D_{POTP}$). In step 845, the user network device 600 transmits Sign(Sign([R0:R1],$D_{aa}$),$D_{POTP}$) to the authenticating entity network device 610, via communications link 630.

After receipt, in step 850 the authenticating entity network device 610 completes the signature on Sign(Sign([R0:R1], $D_{aa}$),$D_{POTP}$), to thereby recover R0 and R1. In this regard, the authenticating entity network device 610 performs Sign(Sign (Sign([R0:R1],$D_{aa}$),$D_{POTP}$),$D_{as}$), to recover R0:R1. As the authenticating entity network device 610 knows R0, it recoups R1. It should be understood that, if desired, in step 845 the user network device 600 could sign [R0:R1] with only the user's portion of the split key, i.e. with $D_{aa}$. In such a case, the authenticating entity network device 610 would need to determine $D_{POTP}$ and apply $D_{as}$ and $D_{POTP}$ in step 855 to complete the signature.

Since all further traffic via communications link 630 is encrypted with R1, which serves as a symmetric session key and which a MITM will not know, there is now a protected non-phishable tunnel 650 established between the user network device 600, executing the IDT, and the authenticating entity network device 610, making it safe to communicate the OTP to the authenticating entity network device. Because the transmission of the OTP is protected by the "protected tunnel" 650, the OTP is referred to as a protected one time password (POTP).

In step 855, the authenticating entity network device 610 transmits, via the communications link 630, a request to the user network device 600 for the one time password (OTP). In response to the request, in step 860, the user or user network device 600 optionally inputs R0 to the OTP token and thereby determines the OTP. In step 865, the user network device 600 encrypts the OTP with symmetric session key R1 to form the POTP. In step 870, the user-network device 600 transmits, via the communications link 630, the POTP to the authenticating entity network device 610.

After receiving the POTP, in step 875, the authenticating entity network device 610 applies symmetric session key R1 to decrypt the POTP and thereby determine the OTP. In step 885, the authenticating entity network device 610 verifies that the OTP is correct, and thereby authenticates the user.

If, and only if, the OTP value is verified to be correct, in step 885 the authenticating entity network device 610 authenticates the user, represented by the user network device 600, to the relying entity network device 605. This can be done in any of a number of ways, as will be well understood by those skilled in the art. Preferably, in step 881 the user network device 600 provides the SSL hash, also known to the relying party network device 605 as part of the client side SSL turned on in step 805, to the authenticating entity network device 610 via the communications link 630. In step 882 the authenticating entity network device 610 signs the SSL hash with $D_{as}$ and in step 883 transmits the partially signed SSL hash via the communications link 630 to the user network device 600 which in step 884 further signs it with $D_{aa}$ and $D_{PTOP}$ and in step 885 transmits the signed SSL hash to the relying party network device 605 via the communication link 620. In step 886 the relying party network device 605 uses the public key credential, $E_{alice}$ of the user to verify the signature on the SSL hash thereby authenticating the user. It will be recognized by those familiar in the art that alternately in step 882 the authenticating entity network device 610 can sign the SSL hash with $D_{as}$ and $D_{POTP}$ and in step 884 the user network device 600 can further sign it with $D_{aa}$ alone. In either case, in this way the relying entity network device 605 is not required to have an individual shared symmetric key with the user network device 600 or authenticating entity network device 610 to obtain verification of the user's one time password. This in turn facilitates single sign-on capability, which one time passwords alone do not facilitate because they are based on shared symmetric keys.

As noted above, the Level 2 implementation can verify the OTP using the OATH technology proposed for the IETF standard for one time passwords, in which case authenticating entity network device 610 does not need to go to any other network or other device in order to do verification of the OTP. On the other hand, verification could alternatively be performed using the existing RSA technology, in which case authenticating entity network device 610 would need to go to an RSA server, which is referred to above as the ACE server, in order to verify the OTP, and the authenticating entity network device 610 would communicate with the RSA server as an external back end server. In still another alternative, the RSA server and the authenticating entity network device 610 could be integrated on the same computer.

If $D_{POTP}$ is applied by the user network device 600 to sign R0:R1, it will be beneficial to use an OTP token which is connectable to the user network device 600. Such connectivity could be a USB or other type of interface. Furthermore, communications between the OTP token and the user network device 600 could be via a wired connection or a wireless connection that it is of limited distant range of perhaps a few inches or feet.

-Exemplary Level 3 Implementation-

Figure 9:
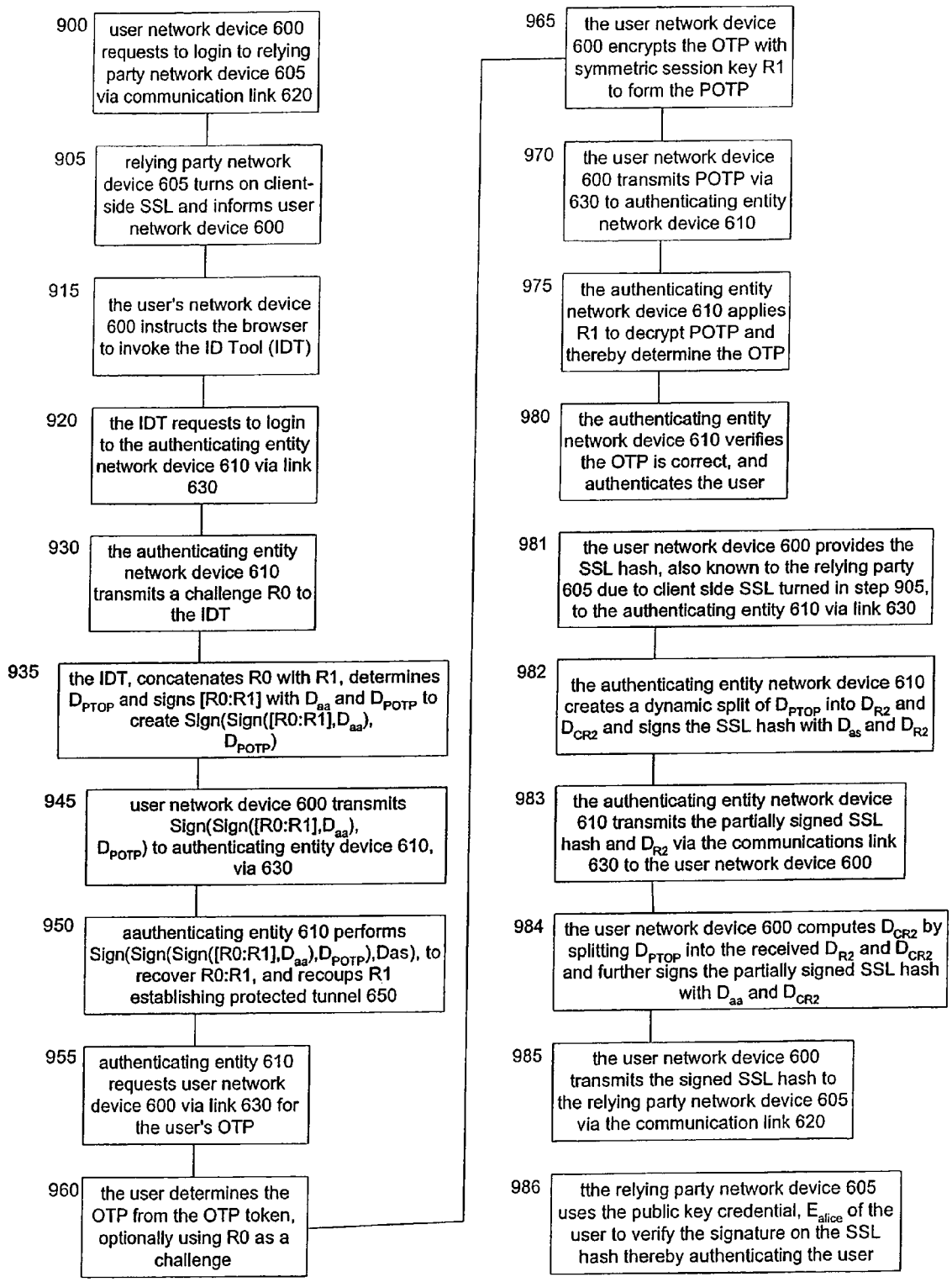
FIG. 9 is a flowchart depicting steps in a third exemplary implementation of the present invention.
Figure 10:
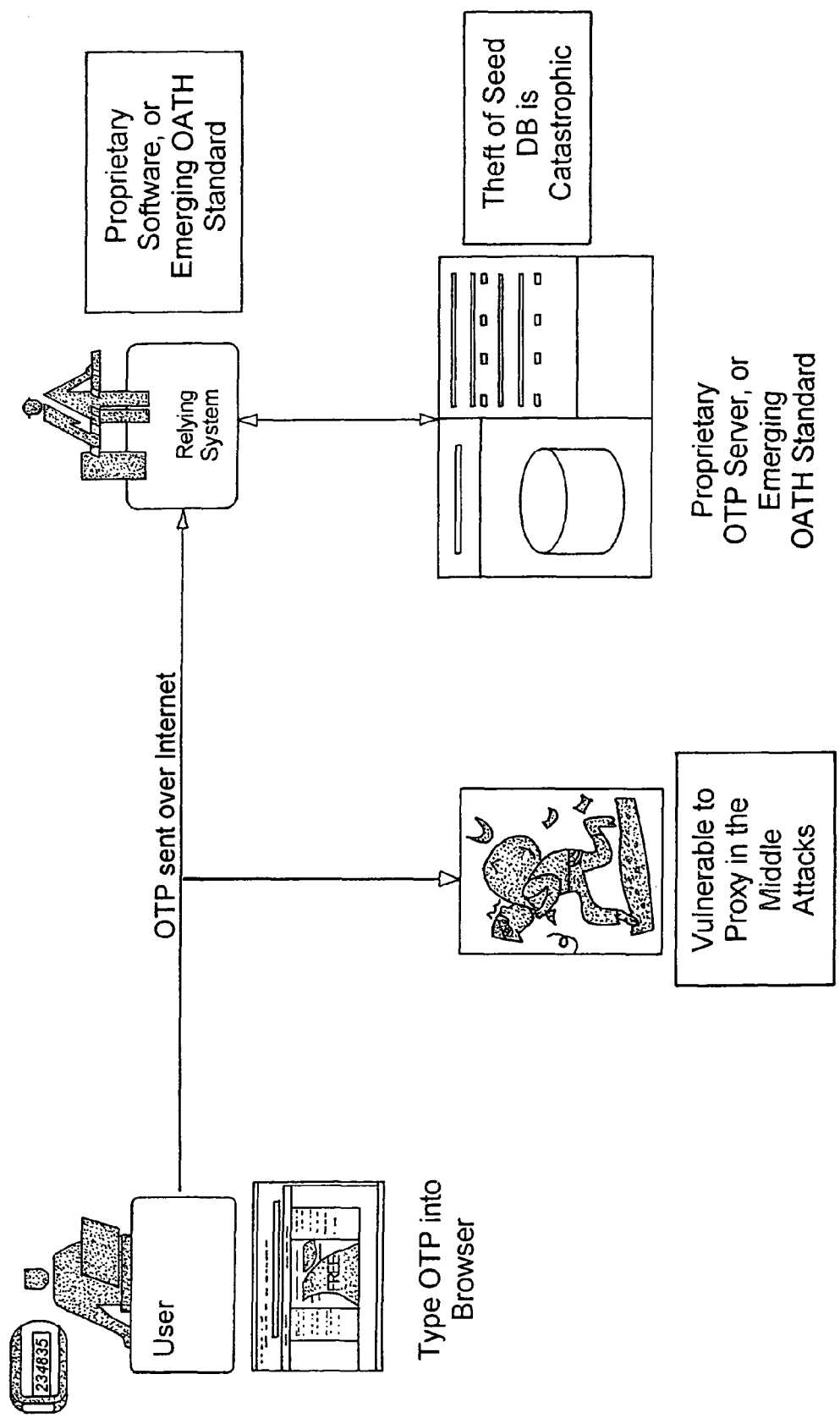
FIG. 10 depicts the vulnerability of one-time-passwords to man-in-the-middle attack.

The steps required in the Level 3 implementation are shown in FIG. 9, and will be described below with reference also to FIG. 6. As has been noted above, in the Level 3 implementation the split key is split into additional portions and is particularly suitable if a challenge-response OTP token is utilized to generate the OTP.

In this implementation, like in the Level 2 implementation, the split key is split into one or more additional portions, one of which corresponds to the OTP. Thus, in this exemplary implementation $D_{alice}$, is split into a client portion $D_{aa}$, a authenticating entity portion $D_{as}$ and another portion $D_{POTP}$, which corresponds to the OTP. $D_{POTP}$ may be the OTP seed itself or some one-way function of this seed. However, in the Level 3 implementation, $D_{POTP}$ itself is split into two key portions. $D_{POTP}$ is also referred to as an OTP constant. This facilitates still greater integration of the OTP with the client side SSL Accordingly, in the Level 3 implementation, $D_{alice}$ is split into $D_{aa}$, $D_{as}$, and one or more other split key portions including $D_{POTP}$, as in the Level 2 implementation. However, in the Level 3 implementation $D_{POTP}$ is further split into $D_{R2}$ and $D_{CR2}$ which can be combined to form $D_{POTP}$. $D_{CR2}$ is said to be the complement of $D_{R2}$. $D_{PTOP}$ is also known as the OTP constant. The OTP constant is preferably stored on the user's OTP token that provides the OTP for the user network device 600 and may also be stored on the authenticating entity network device 605.

More particularly, in step 900 the user network device 600 communicates a request to log-in with the relying party network device 605 via the link 620. In step 905, the relying entity network device, in this case a merchant server, turns on client side SSL, which via a communication to the user network device 600 over link 620 invokes client authentication in the user's network device 600. In response, the user's network device 600, step 915, instructs the browser to invoke what we refer to as the. ID Tool (IDT), which is simply a CAPI or PKCS11 compliant driver.

If it has not already done so, in step 920 the user's network device 600, executing the IDT, transmits a request to the authenticating entity network device 610 to login via communications link 630 saying, for example, "Alice wants to log in." It should be noted, at this point the protected tunnel identified with reference numeral 650 does not exist.

In step 930, the authenticating entity network device 610 responds with a request, via communications link 630, that the user's network device 600 sign a challenge including a large, say 512 bit, random number R0, which could be a symmetric key or a number determined from a symmetric key using a one-way function. Here again, it should be understood that at this point, the protected tunnel identified in FIG. 6 with reference numeral 650 does not exist.

After receiving the request and-challenge, in step 935, the user network device 600, executing the IDT, concatenates R0 with another large, say a 512 bit, random number R1 and the user network device 600 determines $D_{POTP}$ and the user network device 600 signs [R0:R1] with $D_{aa}$ and $D_{POTP}$ to create Sign(Sign([R0:R1],$D_{aa}$),$D_{POTP}$). In step 945, the user network device 600 transmits Sign(Sign([R0:R1],$D_{aa}$),$D_{POTP}$) to the authenticating entity network device 610, via communications link 630.

After receipt, in step 950 the authenticating entity network device 610 completes the signature on Sign(Sign([R0:R1], $D_{aa}$),$D_{POTP}$), to thereby recover R0 and R1. In this regard, the authenticating entity network device 610 performs Sign(Sign (Sign([R0:R1],$D_{aa}$),$D_{POTP}$),$D_{as}$), to complete the signature and recover R0:R1. As the authenticating entity network device 610 knows R0, it recoups R1. It should be understood that, if desired, in step 945 the user network device 600 could sign [R0:R1] with only the user's portion of the split key, i.e. with $D_{aa}$. In such a case, the authenticating entity network device 610 would need to determine $D_{POTP}$ and apply $D_{as}$ and $D_{POTP}$ in step 950 to complete the signature and recover [R0:R1].

Since all further traffic via communications link 630 is encrypted with R1, which serves as a symmetric session key and which a MITM will not know, there is now a protected non-phishable tunnel 650 established between the user network device 600, executing the IDT, and the authenticating entity network device 610, making it safe to communicate the OTP to the authenticating entity network device. Because the transmission of the OTP is protected by the "protected tunnel" 650, the OTP is referred to as a protected one time password (POTP).

In step 955, the authenticating entity network device 610 transmits, via the communications link 630, a request to the user network device 600 for the one time password (OTP). In response to the request, in step 960, the user or user network device 600 optionally inputs R0 to the OTP token and thereby determines the OTP. In step 965, the user network device 600 encrypts the OTP with symmetric session key R1 to form the POTP. In step 970, the user network device 600 transmits, via the communications link 630, the POTP to the authenticating entity network device 610.

After receiving the POTP, in step 975, the authenticating entity network device 610 applies symmetric session key R1 to decrypt POTP and to thereby determine the OTP. In step 980, the authenticating entity network device 610 verifies that the OTP is correct, and thereby authenticates the user.

If, and only if, the OTP value is verified to be correct, in step 990 the authenticating entity network device 610 authenticates the user, represented by the user network device 600, to the relying entity network device 605. This can be done in any of a number of ways, as will be well understood by those skilled in the art. Preferably, in step 981 the user network device 600 provides the SSL hash, also known to the relying party network device 605 as part of the client side SSL turned on in step 905, to the authenticating entity network device 610 via the communications link 630. In step 982 the authenticating entity network device 610 creates a dynamic split of $D_{PTOP}$ into $D_{R2}$ and $D_{CR2}$ and signs the SSL hash with $D_{as}$ and $D_{R2}$. The split is dynamic because every time the protocol is run a different split is created. The authenticating entity network device 610 in step 883 transmits the partially signed SSL hash and $D_{R2}$ via the communications link 630 to the user network device 600 which in step 984 computes $D_{CR2}$ by splitting $D_{PTOP}$ into the received $D_{R2}$ and $D_{CR2}$ and further signs the partially signed SSL hash with $D_{aa}$ and $D_{PTOP}$ and in step 985 transmits the signed SSL hash to the relying party network device 605 via the communication link 620. In step 986 the relying party network device 605 uses the public key credential, $E_{alice}$ of the user to verify the signature on the SSL hash thereby authenticating the user. In this way, the relying entity network device 605 is not required to have an individual shared symmetric key with the user or authenticating entity to obtain verification of the user's one time password. This in turn facilitates single sign-on capability, which one time passwords alone do not facilitate because they are based on shared symmetric keys.

As noted above, the Level 3 implementation can verify the OTP using the OATH technology proposed for the IETF standard for one time passwords, in which case authenticating entity network device 610 does not need to go to any other network or other device in order to do verification of the OTP. On the other hand, verification could alternatively be performed using the existing RSA technology, in which case authenticating entity network device 610 would need to go to an RSA server, which is referred to above as the ACE server, in order to verify the OTP, and the authenticating entity network device 610 would communicate with the RSA server as an external back end server. In still another alternative, the RSA server and the authenticating entity network device 610 could be integrated on the same computer.

Since $D_{CR2}$ is applied by the user network device 600, it will be beneficial to use an OTP token which is connectable to the user network device 600. Such connectivity could be a USB or other type of interface. Furthermore, communications between the OTP token and the user network device 600 could be via a wired connection or a wireless connection that it is of limited distant range of perhaps a few inches or feet.

In summary, the above described POTP cryptography provides a one-time-password authentication with enhanced protection against MITM attacks.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, e.g. in providing security for network communications, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

What is claimed is:

1. A method for authenticating a user of a communications network based on a one-time-password, the user having an associated asymmetric crypto-key pair including a private key D and a public key E; and the private key D being split into a first private key portion D1, a second private key portion D2, and a third private key portion D3 corresponding to the one-time-password, comprising:

partially signing, by the user, a symmetric session key with the first private key portion D1;

receiving, by the authenticating entity from the user via the network, the partially signed symmetric session key;

determining, by the authenticating entity, the third private key portion D3;

completing the signature, by the authenticating entity, on the received partially signed symmetric session key with the second private key portion D2 and the determined third private key portion D3 to recover the symmetric session key;

encrypting, by the user, the one-time-password with the symmetric session key;

receiving, by the authenticating entity from the user via the network, the encrypted one-time-password;

decrypting, by the authenticating entity, the received encrypted one-time-password with the recovered symmetric session key; and authenticating the user based on the decrypted one-time-password.

2. The method according to claim 1, further comprising:

authenticating the user based on the recovery of the symmetric session key by the authenticating entity;

partially signing, by the authenticating entity, the recovered symmetric session key with the second private key portion D2;

receiving, by the user from the authenticating entity via the network, the partially signed symmetric session key;

completing the signature, by the user, on the received partially signed symmetric session key with the first private key portion D1 to recover the symmetric session key; and authenticating the authenticating entity based on the recovery of the symmetric session key by the user.

3. The method according to claim 1, further comprising:

only after authenticating the user based on the decrypted one-time-password, partially signing, by the authenticating entity, a relying party authenticating message with the second private key portion D2;

receiving, by the user from the authenticating entity via the network, the partially signed relying party authenticating message;

further signing, by the user, the received partially signed relying party authenticating message with the first private key portion D1; and transmitting, by the user to a relying party via the network, the further signed relying party authenticating message, wherein the relying party authenticating message is recoverable by applying the public key E to the further signed relying party authenticating message; and authenticating the user based on recovery of the relying party authenticating message by the relying party.

4. The method according to claim 3, wherein:

the network is the Internet; and the relying party authenticating message is a secure socket layer hash.

5. The method according to claim 1, further comprising:

receiving, by the user from an authenticating entity via the network, a challenge;

partially signing, by the user, the received challenge with the first private key portion D1;

receiving, by the authenticating entity from the user via the network, the partially signed challenge;

completing the signature, by the authenticating entity, on the received partially signed challenge with the second private key portion D2 to recover the challenge;

authenticating the user based on the recovery of the challenge by the authenticating entity; and determining, by the user, the one-time-password based on the received challenge.

6. The method according to claim 5, wherein the third private key portion D3 is further split into a fourth private key portion D4 and a fifth private key portion D5, and further comprising:

identifying, by the authenticating entity, a number as the fourth private key portion D4;

partially signing, by the authenticating entity, the recovered symmetric session key with the second private key portion D2 and the fourth private key portion D4;

receiving, by the user from the authenticating entity via the network, the partially signed symmetric session key and the fourth private key portion D4;

determining, by the user, the fifth private key portion D5 based on the third private key portion D3, and the received fourth private key portion D4;

completing the signature, by the user, on the received partially signed symmetric session key with the first private key portion D1 and the determined fifth private key portion D5 to recover the symmetric session key; and authenticating the authenticating entity based on the recovery of the symmetric session key by the user.

7. A system for authenticating a user of a communications network based on a one-time-password, the user having an associated asymmetric crypto-key pair including a private key D and a public key E, and the private key D being split into a first private key portion D1, a second private key portion D2, and a third private key portion D3 corresponding to the one-time-password, comprising:

a user network device configured to
 (i) partially sign a symmetric session key with the first private key portion D1,
 (ii) transmit the partially signed symmetric session key via the network,
 (iii) encrypt the one-time-password with the symmetric session key, and
 (iv) transmit the encrypted one-time-password via the network; and an authenticating entity network device configured to
 (i) receive the transmitted partially signed symmetric session key,
 (ii) determine the third private key portion D3,
 iii) complete the signature on the received partially signed symmetric session key with the second private key portion D2 and the determined third private key portion D3 to recover the symmetric session key,
 (iv) receive the transmitted encrypted one-time-password,
 (v) decrypt the received encrypted one-time-password with the recovered symmetric session key, and
 (vi) authenticate the user based on the decrypted one-time-password.

8. The system according to claim 7, wherein:

the authenticating entity network device is further configured to (i) authenticate the user based on the recovery of the symmetric session key, (ii) partially sign the recovered symmetric session key with the second private key portion D2, and (iii) transmit the partially signed symmetric session key via the network; and the user network device is further configured to (i) receive the transmitted partially signed symmetric session key, (ii) complete the signature on the received partially signed symmetric session key with the first private key portion D1 to recover the symmetric session key, and (iii) authenticate the authenticating entity based on the recovery of the symmetric session key.

9. The system according to claim 7, wherein:
the authenticating entity network device is further configured to, only after authenticating the user based on the decrypted one-time-password, (i) partially sign a relying party authenticating message with the second private key portion D2, and (ii) transmit the partially signed relying party authenticating message via the network;
the user network device is further configured to (i) receive the transmitted partially signed relying party authenticating message, (ii) further sign the received partially signed relying party authenticating message with the first private key portion D1, and (iii) transmit the further signed relying party authenticating message to a relying party via the network;
the relying party authenticating message is recoverable by completing the signature on the further signed relying party authenticating message with the public key E; and
authenticating the user based on recovery of the relying party authenticating message by the relying party.

10. The system according to claim 7, wherein:
the authenticating entity network device is further configured to transmit a challenge via the network;
the user network device is further configured to (i) receive the transmitted challenge, (ii) partially sign the received challenge with the first private key portion D1, (iii) transmit the partially signed challenge via the network, and (iv) determine the one-time-password based on the received challenge; and
the authenticating entity network device is further configured to (i) receive the partially signed challenge, (ii) complete the signature on the received partially signed challenge with the second private key portion D2 to recover the challenge, and (iii) authenticate the user based on the recovery of the challenge.

11. The system according to claim 10, wherein:
the third private key portion D3 is further split into a fourth private key portion D4 and a fifth private key portion D5;
the authenticating entity network device is further configured to
(i) identify a number as the fourth private key portion D4,
(ii) partially sign the recovered symmetric session key with the second private key portion D2 and the fourth private key portion D4,
(iii) transmit the partially signed symmetric session key via the network, and
(iv) transmit the fourth private key portion D4 via the network; and
the user network device is further configured to
(i) receive the transmitted partially signed symmetric session key and the transmitted fourth private key portion D4,
(ii) determine the fifth private key portion D5 based on the third private key portion D3 and the received fourth private key portion D4,
(iii) complete the signature on the received partially signed symmetric session key with the first private key portion D1 and the determined fifth private key portion D5 to recover the symmetric session key, and
(iv) authenticate the authenticating entity based on the recovery of the symmetric session key.

12. A method for authenticating a user of a communications network based on a one-time-password, the user having an associated asymmetric crypto-key pair including a private key D and a public key E, and the private key D being split into a first private key portion D1, a second private key portion D2, and a third private key portion D3 corresponding to the one-time-password, comprising:
receiving a first network communication from the user including a symmetric session key partially signed with the first private key portion D1;
determining the third private key portion D3;
completing the signature on the received partially signed symmetric session key with the second private key portion D2 and the determined third private key portion D3 to recover the symmetric session key;
receiving a second network communication from the user including a one-time-password encrypted with the symmetric session key;
decrypting the received encrypted one-time-password with the recovered symmetric session key; and
authenticating the user based on the decrypted one-time-password.

13. The method according to claim 12, further comprising:
also authenticating the user based on the recovery of the symmetric session key;
partially signing the recovered symmetric session key with the second private key portion D2;
transmitting a third network communication to the user including the partially signed symmetric session key, wherein the signature on the transmitted partially signed symmetric session key can be completed with the first private key portion D1 to recover the symmetric session key and thereby authenticate the authenticating entity to the user.

14. The method according to claim 12, further comprising:
only after authenticating the user based on the decrypted one-time-password, partially signing a relying party authenticating message with the second private key portion D2;
transmitting a third network communication to the user including the partially signed relying party authenticating message, wherein the transmitted partially signed relying party authenticating message can be further signed by the user with the first private key portion D1, so that the relying party authenticating message is recoverable by completion of the signature on the further signed relying party authenticating message with the public key E by a relying party.

15. The method according to claim 12, further comprising:
transmitting a third network communication to the user including a challenge;
receiving a fourth network communication from the user including the transmitted challenge partially signed by the user with the first private key portion D1;
completing the signature on the received partially signed challenge with the second private key portion D2 to recover the challenge; and
also authenticating the user based on the recovery of the challenge.

16. The method according to claim 15, wherein the third private key portion D3 is further split into a fourth private key portion D4 and a fifth private key portion D5, and further comprising:
identifying a number as the fourth private key portion D4;

partially signing the recovered symmetric session key with the second private key portion D2 and the fourth private key portion D4;

transmitting a fifth network communication to the user including the partially signed symmetric session key and the fourth private key portion D4, wherein the signature on the transmitted partially signed symmetric session-key can be completed by the user with the first private key portion D1 and the fifth private key portion D5 to recover the symmetric session key and thereby authenticate the authenticating entity to the user.

17. A system for authenticating a user of a communications network based on a one-time-password, the user having an associated asymmetric crypto-key pair including a private key D and a public key E, and the private key D being split into a first private key portion D1, a second private key portion D2, and a third private key portion D3 corresponding to the one-time-password, comprising:

a network interface configured to receive
  (i) a first network communication including a symmetric session key partially signed with the first private key portion D1 and
  (ii) a second network communication including the one-time-password encrypted with the symmetric session key; and a processor configured to
  (i) determine the third private key portion D3;
  (ii) complete the signature on the received partially signed symmetric session key with the second private key portion D2 and the determined third private key portion D3 to recover the symmetric session key,
  (iii) decrypt the received encrypted one-time-password with the recovered symmetric session key, and authenticate the user based on the decrypted one-time-password.

18. The system according to claim 17, wherein:
the processor is further configured to (i) also authenticate the user based on the recovery of the symmetric session key, (ii) partially sign the recovered symmetric session key with the second private key portion D2, (iii) direct transmission of a third network communication including the partially signed symmetric session key;
the network interface is further configured to transmit the third network communication in accordance with the processor directive; and
the signature on the transmitted partially signed symmetric session key can be completed with the first private key portion D1 to recover the symmetric session key and thereby authenticate the authenticating entity to the user.

19. The system according to claim 17, wherein:
the processor is further configured to, only after authenticating the user based on the decrypted one-time-password, (i) partially sign a relying party authenticating message with the second private key portion D2, and (ii) direct transmission of a third network communication to the user including the partially signed relying party authenticating message;
the network interface is further configured to transmit the third network communication in accordance with the processor directive; and
the transmitted partially signed relying party authenticating message can be further signed by the user with the first private key portion D1, so that the relying party authenticating message is recoverable by completion of the signature on the further signed relying party authenticating message with the public key E by a relying party.

20. The system according to claim 17, wherein:
the interface is further configured to (i) transmit a third network communication to the user including a challenge, (ii) receive a fourth network communication from the user including the transmitted challenge partially signed by the user with the first private key portion D1;
the processor is further configured to (i) complete the signature on the received partially signed challenge with the second private key portion D2 to recover the challenge, and (ii) also authenticate the user based on the recovery of the challenge.

21. The system according to claim 20, wherein:
the third private key portion D3 is further split into a fourth private key portion D4 and a fifth private key portion D5;
the processor is further configured to
  (i) identify a number as the fourth private key portion D4,
  (ii) partially sign the recovered symmetric session key with the second private key portion D2 and the fourth private key portion D4, and
  (iii) direct transmission of a fifth network communication to the user including the partially signed symmetric session key and the fourth private key portion D4; and
the signature on the transmitted partially signed symmetric session key can be completed by the user with the first private key portion D1 and the fifth private key portion D5 to recover the symmetric session key and thereby authenticate the authenticating entity to the user.

* * * * *